(12) United States Patent
Brueckner et al.

(10) Patent No.: US 9,384,677 B2
(45) Date of Patent: *Jul. 5, 2016

(54) AUTOMATED EXECUTION AND EVALUATION OF NETWORK-BASED TRAINING EXERCISES

(71) Applicant: Architecture Technology Corporation, Minneapolis, MN (US)

(72) Inventors: Stephen K. Brueckner, Ithaca, NY (US); Frank N. Adelstein, Ithaca, NY (US); Haim Yehuda Bar, Ithaca, NY (US); Matthew P. Donovan, Trumansburg, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/683,923

(22) Filed: Apr. 10, 2015

(65) Prior Publication Data

US 2015/0213730 A1 Jul. 30, 2015

Related U.S. Application Data

(63) Continuation of application No. 12/388,425, filed on Feb. 18, 2009, now Pat. No. 9,076,342.

(60) Provisional application No. 61/029,734, filed on Feb. 19, 2008.

(51) Int. Cl.
*G09B 19/00* (2006.01)
*G09B 5/00* (2006.01)
(Continued)

(52) U.S. Cl.
CPC .............. *G09B 19/0053* (2013.01); *G09B 5/00* (2013.01); *G09B 7/00* (2013.01); *G09B 9/00* (2013.01); *G09B 19/003* (2013.01)

(58) Field of Classification Search
CPC .................... G09B 19/0053; H04L 63/1441
See application file for complete search history.

(56) References Cited

U.S. PATENT DOCUMENTS 4,895,518 A 1/1990 Arnold et al.
5,601,432 A 2/1997 Bergman
(Continued)

FOREIGN PATENT DOCUMENTS

WO 02071192 A2 9/2002

OTHER PUBLICATIONS

Zeng et al., "GloMoSinn: A library for Parallel Simulation of Large-scale Wireless Networks" ACM SIGSIM Simulation Digest, vol. 28, Issue 1, Jul. 1998, 9 pp.
(Continued)

*Primary Examiner* — Robert J Utama
(74) *Attorney, Agent, or Firm* — Shumaker & Sieffert, P.A.

(57) ABSTRACT

This disclosure generally relates to automated execution and evaluation of computer network training exercises, such as in a virtual machine environment. An example environment includes a control and monitoring system, an attack system, and a target system. The control and monitoring system initiates a training scenario to cause the attack system to engage in an attack against the target system. The target system then performs an action in response to the attack. Monitor information associated with the attack against the target system is collected by continuously monitoring the training scenario. The attack system is then capable of sending dynamic response data to the target system, wherein the dynamic response data is generated according to the collected monitor information to adapt the training scenario to the action performed by the target system. The control and monitoring system then generates an automated evaluation based upon the collected monitor information.

22 Claims, 12 Drawing Sheets

(51) Int. Cl.
G09B 7/00 (2006.01)
G09B 9/00 (2006.01)

(56) References Cited

U.S. PATENT DOCUMENTS

| | | | |
|---|---|---|---|
| 5,944,783 | A | 8/1999 | Nieten |
| 6,345,283 | B1 | 2/2002 | Anderson |
| 7,058,968 | B2 | 6/2006 | Rowland et al. |
| 7,107,347 | B1* | 9/2006 | Cohen ............... H04L 29/12009 709/218 |
| 7,228,566 | B2* | 6/2007 | Caceres ............. H04L 63/1433 707/999.01 |
| 7,325,252 | B2 | 1/2008 | Bunker et al. |
| 7,496,959 | B2 | 2/2009 | Adelstein et al. |
| 7,694,328 | B2 | 4/2010 | Joshi et al. |
| 7,748,040 | B2 | 6/2010 | Adelstein et al. |
| 7,818,804 | B2 | 10/2010 | Marceau |
| 7,886,049 | B2 | 2/2011 | Adelstein et al. |
| 7,925,984 | B2 | 4/2011 | Awe et al. |
| 8,079,080 | B2 | 12/2011 | Borders |
| 8,176,557 | B2 | 5/2012 | Adelstein et al. |
| 8,250,654 | B1 | 8/2012 | Kennedy et al. |
| 8,266,320 | B1 | 9/2012 | Bell et al. |
| 8,321,437 | B2 | 11/2012 | Lim |
| 8,341,732 | B2 | 12/2012 | Croft et al. |
| 8,554,536 | B2 | 10/2013 | Adelman et al. |
| 9,076,342 | B2 | 7/2015 | Brueckner et al. |
| 2002/0073204 | A1 | 6/2002 | Dutta et al. |
| 2002/0078382 | A1 | 6/2002 | Sheikh et al. |
| 2002/0129264 | A1 | 9/2002 | Rowland et al. |
| 2002/0162017 | A1 | 10/2002 | Sorkin et al. |
| 2003/0236993 | A1 | 12/2003 | McCreight et al. |
| 2004/0039921 | A1 | 2/2004 | Chuang |
| 2005/0132225 | A1 | 6/2005 | Gearhart |
| 2005/0193173 | A1 | 9/2005 | Ring et al. |
| 2005/0203921 | A1 | 9/2005 | Newman et al. |
| 2006/0037076 | A1 | 2/2006 | Roy |
| 2006/0167855 | A1 | 7/2006 | Ishikawa et al. |
| 2006/0248525 | A1 | 11/2006 | Hopkins |
| 2006/0253906 | A1 | 11/2006 | Rubin et al. |
| 2007/0055766 | A1 | 3/2007 | Petropoulakis et al. |
| 2007/0112714 | A1 | 5/2007 | Fairweather |
| 2007/0192863 | A1* | 8/2007 | Kapoor ................... G06F 9/505 726/23 |
| 2008/0167920 | A1 | 7/2008 | Schmidt et al. |
| 2008/0183520 | A1 | 7/2008 | Cutts et al. |
| 2008/0222734 | A1 | 9/2008 | Redlich et al. |
| 2009/0007270 | A1* | 1/2009 | Futoransky ......... H04L 63/1433 726/25 |
| 2009/0150998 | A1 | 6/2009 | Adelstein et al. |
| 2009/0158430 | A1 | 6/2009 | Borders |
| 2009/0164522 | A1 | 6/2009 | Fahey |
| 2009/0254572 | A1 | 10/2009 | Redlich et al. |
| 2009/0288164 | A1 | 11/2009 | Adelstein et al. |
| 2009/0319247 | A1 | 12/2009 | Ratcliffe, III et al. |
| 2009/0319249 | A1 | 12/2009 | White et al. |
| 2009/0319647 | A1 | 12/2009 | White et al. |
| 2009/0319906 | A1 | 12/2009 | White et al. |
| 2009/0320137 | A1 | 12/2009 | White et al. |
| 2009/0328033 | A1 | 12/2009 | Kohavi et al. |
| 2010/0010968 | A1 | 1/2010 | Redlich et al. |
| 2010/0058114 | A1 | 3/2010 | Perkins et al. |
| 2010/0146615 | A1 | 6/2010 | Locasto et al. |
| 2012/0210427 | A1 | 8/2012 | Bronner et al. |

OTHER PUBLICATIONS

Howard et al., "A Common Language for Computer Security Incidents," Sandia National Laboratories Report, SAND98 8667, Oct. 1998, 32 pp.
Keshav, "Real: A Network Simulator," Computer Science Division, Department of Electrical Engineering and Computer Science, University of Berkeley, Dec. 1988, 10 pp.
Krishna et al., "V-NetLab: A Cost-Effective Platfonn to Support Course Projects in Computer Security", Department of Computer Science, Stony Brook University, Jun. 2005, 7 pp.
McDonald, "A network specification language and execution environment for undergraduate teaching," ACM SIGCSE Bulletin, vol. 23, Issue 1, Mar. 1991,11 pp.
Carson et al., "NIST NET: A Linux-based network emulation tool" ACM SIGCOMM, Computer Communication Review, vol. 33, Issue 3, Jul. 2003, 16 pp.
Padman et al., "Design of a Virtual Laboratory for Information Assurance Education and Research," Proceedings of the 2002 IEEE, Workshop on Information Assurance and Security, U.S. Military Academy, West Point, Jun. 2002, 7 pp.
Varga, "The OMNeT++ Discrete Event Simulation System," Department of Telecommunications, Budapest University of Technology and Economics, Proceedings of the European Simulation Multiconference, Jun. 2001, 8 pp.
Wang et al., "The Design and Implementation of the NCTUns 1.0 Network Simulator," Computer Networks, vol. 42, Issue 2, Jun. 2003, 23 pp.
Honeynet Project, "Know Your Enemy: Defining Virtual Honeynets," http://old.honeynet.org/papers.virtual/, Jan. 27, 2003, 5 pp.
Lathrop et al., "Modeling Network Attacks in MAADNET," 12th Conference on Behavior Representation in Modeling and Simulation, May 12-15, 2003,16 pp.
Stytz et al., "Realistic and Affordable Cyberware Opponents for the Information Warfare BattleSpace," Jun. 2003, 42 pp.
Vrable et al., "Scalability, Fidelity, and Containment in the Potemkin Virtual Honeyfarm," SOSP, Oct. 23-26, 2005, 15 pp.
Davoli, "Virtual Square," Proceedings of the First International Conference on Open Source Systems, Genova, Jul. 11-15th, 2005, 6 pp.
Davoli, "Virtual Square: all the virtuality you always wanted but you were afraid to ask," http://virtualsguare.org/copyright Renzo Davoli, May 27, 2004, 1 pp.
Stumpf et al., "NoSE—building virtual honeynets made easy," Darmstadt University of Technology, Department of Computer Science, D-64289 Darmstadt, Germany, 2005, 11 pp.
Liljenstam et al., "RINSE: 'The Real—Time Immersive Network Simulation Environment for Network Security Exercises," Proceedings of the 19th Workshop on Principles of Advanced and Distributed Simulation (PADS), Jun. 2005, 10 pp.
White et al.,"Cyber Security Exercises: Testing an Organization's Ability to Prevent, Detect and Respond to Cyber Security Events," Proceeding of the 37th Hawaii International Conference on System Sciences, Jan. 2004, 10 pp.
Schepens et al., "The Cyber Defense Exercise: An evaluation of the Effectiveness of Information Assurance Education," 2003, 14 pp.
Saic et al., "TeamDefend, A White Paper on Strengthening the Weakest Link: Organizational Cyber Defense Training," 17th Annual First Conference, Jun. 26—Jul. 1, 2005, 6 pp.
ATC-NY et al.,"Cyber Defense Simulation Trainer (CYDEST)," CYDEST Congressional Briefing, Feb. 19, 2007, 1 pp.
Brueckner et al., "CYDEST Cyber Defense Simulation Trainer," ATC-NY a subsidiary of Architecture Technology Corporation, Oct. 29, 2007, 20 pp.
Architecture Technology Corporation et al.,"Cydest (Cyber Defense Simulation Trainer),"http://web.archive.org/web/20061107010247/www.atcorp.com/securesystems/cydest.html, Dec. 2005, 1 pp.
Crumb, "Hackfest Highlights Cyber Security Boot Camp," Air Force Research Laboratory (AFRL) Information Directorate document, Oct./Nov. 2004, 1 pp.
Duggirala et al., "Open Network Emulator," found at hllp:/csrl.cs.vt.edu/net_emulation.html, Jan. 15, 2005, 5 pp.
Bergstrom et al., "The Distributed Open Network Emulator: Using Relativistic Time for Distributed Scalable Simulation," Proceedings of the 20th Workshop on Principles of Advanced and Distributed Simulation, May 23-26 2006, 7 pp.
Saunders, "Simulation Approaches in Information Security Education," Proceedings of the Sixth National Colloquium for Information Systems Security Education, Redmond, Washington, Jun. 4-6, 2002, 14 pp.

(56) References Cited

OTHER PUBLICATIONS

Lathrop et al., "Information Warfare in the Trenches: Experiences from the Firing Range," U.S. Military Academy, Security education and critical infrastructures, Kluwer Academic Publishers Norwell, MA, USA © Jun. 23-26, 2003, 22 pp.

Schafer et al., "The IWAR Range: A Laboratory for Undergraduate Information Assurance Education," Military Academy West Point, NY, Research paper, found at http:I/handle.dtic.mil/1 00.2/ ADA408301, Nov. 7, 2000, 7 pp.

McGrath et al., "NetSim: A Distributed Network Simulation to Support Cyber Exercises," Institute for Security Technology Studies, Dartmouth College, Huntsville Simulation Conference, Mar. 9- 11, 2004, Huntsville, Alabama, 6 pp.

Carver et al., "Military Academy Attack/Defense Network" IEEE Systems, Man, and Cybernetics Information Assurance and Security Workshop, West Point, NY, Jun. 17-19, 2002, 6 pp.

C.M.U. Entertainment Technology Center, "CyberSecurity," found at http://www.etc.cmu.edu/projects/cybersecurity/, Feb. 2000, 17 pp.

Air Force SBIR/STTR Award Details, "CYDEST: CYber DEfense Simulation Trainer," Phase I, Award Details Status: Completed (Invited for Phase II) Start: Apr. 13, 2005 End Jan. 13, 2006, retrieved on Jun. 16, 2015 from http://www.afsbirsttr.com/award/AWARD-Details.aspx?pk=12036, 2 pp.

Prosecution History from U.S. Pat. No. 9,076,342, dated Dec. 22, 2011 through Jan. 9, 2015, 181 pp.

* cited by examiner

CYDEST Scenarios

To begin training session, click on the scenario name.

| Scenario name | Description | Previous executions |
|---|---|---|
| DoS attack | You are responsible for maintaining the availability of web servers for a small company. Today someone launches a Denial of Service attack against which you will have to defend. | |
| AOC inside attack | You are responsible for security and forensics at a small trucking company. Your supervisor suspects a malicious insider of leaking information and asks you to investigate. | |

FIG. 6

| | 902 | 904 | 906 | | 908 | 910 |
|---|---|---|---|---|---|---|
| evaluation | [Date/Time] | Service available | System name/ID<br>Service name | web2<br>http | | +5 |
| system | [Date/Time] | Machine started | System name/ID | target.firewall | | |
| evaluation | [Date/Time] | Firewall rule added | System name/ID<br>Rule | firewall.target_network<br>("DROP\s+(all\|tcp)\s+.*43\.125\.13\.21\s+\S+) | | +5 |
| system | [Date/Time] | Stopped single-source DoS attack | | | | |
| system | [Date/Time] | Started multiple-source DoS attack | Source IP addresses<br><br>Target IP addresses<br>Packet rate | 23.0.0.0/8, 154.0.0.0/8, 78.0.0.0/8, 93.0.0.0/8,<br>115.0.0.0/8, 137.0.0.0/8, 65.132.0.0/16, 45.0.0.0/8,<br>104.32.212.10,<br>100 | | |
| im | [Date/Time] | Sent IM message | IM message | Sent notification of attacker switching to multi-source attack | | |
| evaluation | [Date/Time] | Service unavailable | System name/ID<br>Service name | web1<br>http | | |
| notebook | [Date/Time] | Unusual network traffic<br>Increased incoming network traffic | Source IP addresses<br><br>Target IP address<br>Port number<br>Comments | 23.12.106.129, 154.141.9.144, etc<br><br>104.32.212.12<br>80<br>Multiple source IPs are hitting web1 | | +10 |
| evaluation | [Date/Time] | Changed the syncookies flag | System name/ID<br>syncookies value | web1.target<br>1 | | +20 |

FIG. 9

//AUTOMATED EXECUTION AND EVALUATION OF NETWORK-BASED TRAINING EXERCISES

RELATED APPLICATION

This application is a continuation of U.S. application Ser. No. 12/388,425, filed Feb. 18, 2009, which claims priority to Provisional Application No. 61/029,734, filed Feb. 19, 2008, each of which is incorporated by reference herein in its entirety.

STATEMENT REGARDING FEDERALLY SPONSORED RESEARCH OR DEVELOPMENT

This invention was made with Government support under Contract FA8650-06-C-6648 with the United States Air Force. The Government has certain rights in this invention.

TECHNICAL FIELD

This disclosure relates to techniques for execution of computer network training exercises.

BACKGROUND

Computer-based training may one of the most effective teaching methods available today, as evidenced, for example, by the military's dedication to training exercises in preparation for battle (e.g., flight simulators). Computer-based training exercises may cover a wide array of training topics, and trainees may have the flexibility of performing training exercises using either local or remote computer connections. Trainees may even obtain online training via the Internet.

Currently, there are certain computer-based training exercises that involve simulation within a training environment. Trainees can often obtain a great amount of educational training by performing actions in such a training environment. A number of different types of environments that are used today provide varying levels of training and evaluation. For example, there are certain environments that allow trainees to participate in small-scale training exercises. These types of environments may provide a certain degree of automation and evaluation, but typically involve fairly simple or straightforward exercises that are to be performed by the trainees. In addition, in these type of environments, trainees typically train alone, such as on their individual computers, rather than participating on a team.

Other forms of environments, such as those that may often be used in the military, allow trainees to engage in much more complex or sophisticated training exercises, and may also allow trainees to work with others in a team setting. Typically, however, these environments involve large-scale group exercises, and may require a large amount of control and supervision by instructors. There may be little to no computer automation in such environments. However, trainees may be able to engage in much more interaction with others or the training environment ("free play"), without being burdened by the restrictions of small-scale systems. Although trainees may use may use one or more computers in these environments, instructors often are required to manually grade or otherwise evaluate the performance of trainees.

SUMMARY

The disclosure generally relates to automated execution and evaluation of computer network training exercises, such as in a virtual machine environment. The disclosure also relates to techniques for providing out-of-band data connections within the environment that may be used to monitor and/or control one or more training scenarios. One example of such a training environment is one in which a trainee defends or attacks one or more computer networks for a cyber attack. The training environment is capable of automatically monitoring and responding to actions taken by a user, such as a trainee. This provides an automated interaction resulting in improved training. Attack generation may be coupled with user responses to provide a more realistic situation, and the training environment may also facilitate instructor evaluation. In addition, the training environment may also allow trainees to participate both in small-scale and large-scale exercises, as well as engaging in "free play" activities, which may then be automatically evaluated. Trainees may include network administrators, first responders, and/or digital forensics investigators. In some cases, human trainees, as participants, may be able to engage in activities against each other. For example, one human participant may be tasked with attacking a network, and a second human participant may be tasked with defending that network. In these cases, the training environment is capable of providing automated evaluation of tasks performed by the human participants.

In certain cases, the training environment utilizes one or more virtual machines within one or more virtual networks. Virtual machines are full-fidelity and are therefore fully realistic, and they also may provide certain advantages over using real computers, such as having reduced hardware footprints, easier scenario management, and better visibility for evaluation and control.

In one embodiment, a system comprises one or more processors, a control and monitoring system, an attack system, and a target system that are each executable by the one or more processors (wherein the attack system and the target system may, in some cases, comprise the same system, such as in an insider attack). The control and monitoring system initiates a training scenario to cause the attack system to engage in an attack against the target system, and also collects monitoring information associated with the attack by continuously monitoring the training scenario. The target system performs an action in response to the attack, and the attack system sends dynamic response data to the target system based upon the collected monitoring information to adapt the training scenario to the action performed by the target system. The control and monitoring system generates an automated evaluation based upon the collected monitoring information.

In one embodiment, a method comprises the following: providing a training environment that includes a control and monitoring system, an attack system, and a target system each executable by one or more processors; initiating, by the control and monitoring system, a training scenario to cause the attack system to engage in an attack against the target system; performing an action by the target system in response to the attack; collecting monitor information associated with the attack against the target system by continuously monitoring the training scenario; sending dynamic response data from the attack system to the target system based upon the collected monitor information to adapt the training scenario to the action performed by the target system; and generating, by the control and monitoring system, an automated evaluation based upon the collected monitor information.

In one embodiment, a computer-readable medium comprises instructions that, when executed, cause one or more processors to: provide a training environment that includes a control and monitoring system, an attack system, and a target system; initiate, by the control and monitoring system, a training scenario to cause the attack system to engage in an attack against the target system; perform an action by the target system in response to the attack; collect monitor information associated with the attack against the target system by continuously monitoring the training scenario; send dynamic response data from the attack system to the target system based upon the collected monitor information to adapt the training scenario to the action performed by the target system; and generate, by the control and monitoring system, an automated evaluation based upon the collected monitor information.

In one embodiment, a method comprises the following: providing a training environment that includes a control and monitoring system, an attack system, and a target system each executable by one or more processors; initiating, by the control and monitoring system, a training scenario to cause the attack system to engage in an attack against the target system; sending scenario traffic for the training scenario on a first communication channel; sending out-of-band data for the training scenario on a second communication channel that is distinct from the first communication channel, wherein the out-of-band data is not visible to a trainee and does not interfere with the scenario traffic sent on the first communication channel; and monitoring the training scenario by the control and monitoring system using the out-of-band data.

The details of one or more embodiments of the invention are set forth in the accompanying drawings and the description below. Other features, objects, and advantages will be apparent from the description and drawings, and from the claims.

BRIEF DESCRIPTION OF DRAWINGS

FIG. 6 is a screen diagram illustrating various training scenarios that may be executed with the training environments shown in FIGS. 1A and 1B, according to one embodiment.

FIG. 9 is a screen diagram illustrating an audit log that may be used within the training environments shown in FIGS. 1A and 1B, according to one embodiment.

DETAILED DESCRIPTION

Figure 1A:
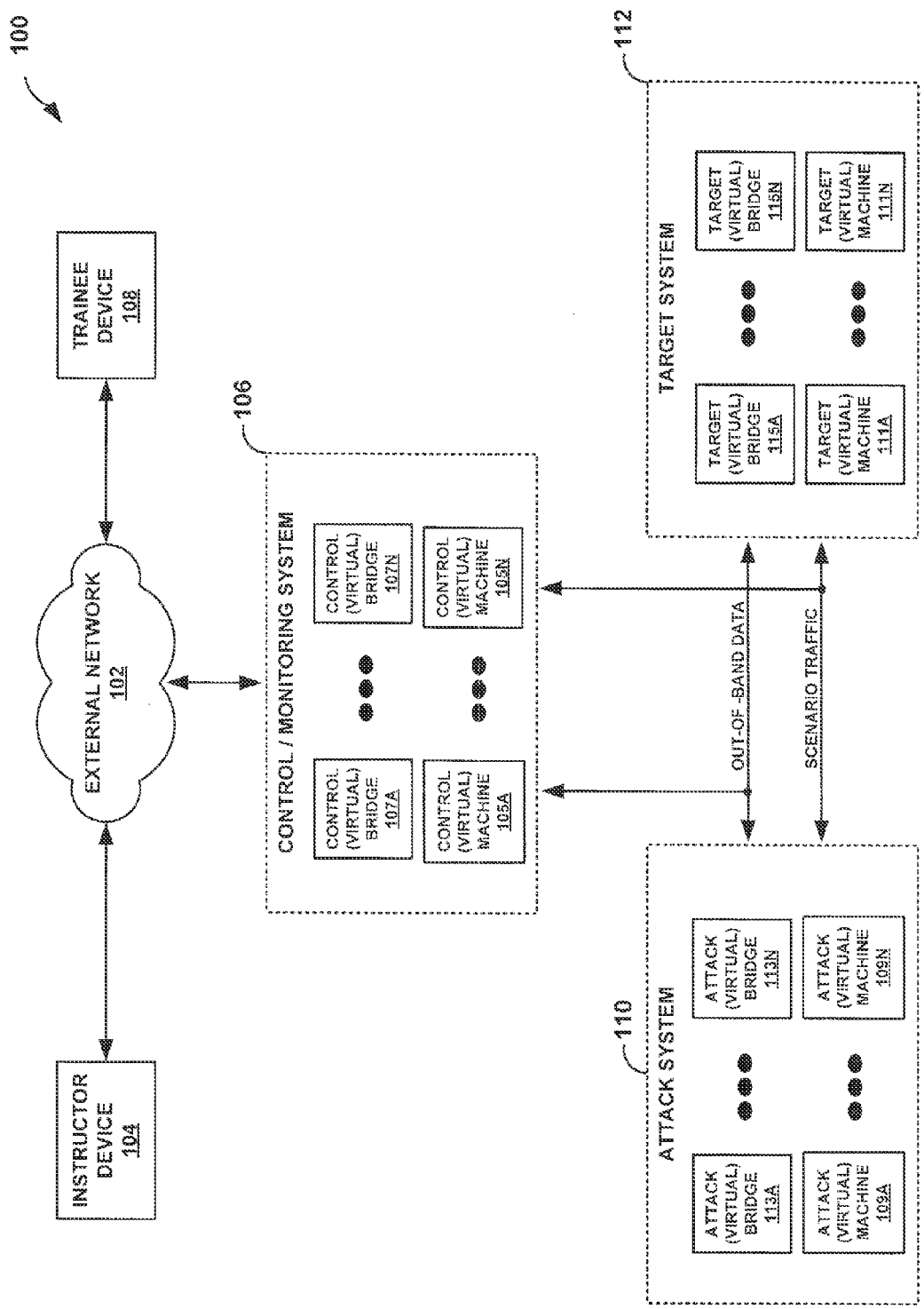
FIG. 1A is a block diagram illustrating a training environment that includes a control/monitoring system, an attack system, and a target system, according to one embodiment.

FIG. 1A is a block diagram illustrating an training environment 100 that includes a control/monitoring system 106, an attack system 110, and a target system 112, according to one embodiment. Training environment 100 comprises one or more computer systems, according to one embodiment. Control/monitoring system 106 is communicatively coupled both to attack system 110 and target system 112. In this embodiment of training environment 100, attack system 110 is configured to engage in an attack of target system 112. A trainee who uses trainee device 108 is tasked with protecting, or otherwise managing, target system 112 during the attack. Attack system 110 may automatically respond to actions taken by the trainee in an intelligent fashion, and, at the end of a tactical-level training exercise, the trainees performance may be evaluated based on data collected during the exercise. Trainees may include network administrators, first responders, and/or digital forensics investigators.

In one embodiment, control/monitoring system 106, attack system 110, and target system 112 are housed within a common computing device, such as a personal computer. In another embodiment, control/monitoring system 106, attack system 110, and target system 112 are housed within two or more separate computing devices, and may each be housed in a separate computing device. As shown in FIG. 1A, trainee device 108 is communicatively coupled to target system 112 via external network 102 and control/monitoring system 106. In one embodiment, trainee device 108 and target system 112 are housed in a common computing device, while in another embodiment, trainee device 108 and target system 112 are housed in separate computing devices. Trainee device 108 may be communicatively coupled to target system 112 through a public network, such as the Internet, such that the trainee may remotely log into target system 112 during a training exercise. Trainee device 108 is capable of sending commands and instructions to target system 112 to control various functions of target system 112. Trainee device 108 is also capable of receiving information from target system 112.

An instructor of the training exercise within training environment 100 uses an instructor device 104. Instructor device 104 is communicatively coupled to control/monitoring system 106 via external network 102. In one embodiment, instructor device 104 and control/monitoring system 106 are housed in a common computing device, while in another embodiment, instructor device 104 and control/monitoring system 106 are housed in separate computing devices. Instructor device 104 may be communicatively coupled to control/monitoring system 106 through a public network, such as the Internet, such that the instructor may remotely log into control/monitoring system 112 during a training exercise if desired (or if necessary). Instructor device 104 is capable of sending commands and instructions to control/monitoring system 106 to control various functions of control/monitoring system 106. Instructor device 104 is also capable of receiving information from control/monitoring system 106. In one embodiment, when an instructor typically logs into instructor device 104 to help model or configure training environment 100, but may otherwise allow training exercises to be executed in an automated fashion.

Control/monitoring system 106 is also coupled to an external network 102. External network 102 may comprise a private network or a public network, such as the Internet. Because control/monitoring system 106 is coupled to network 102, it is able to access external resources that may be used during training exercises, or may be accessed by remote devices. Control/monitoring system 106 controls various aspects of training environment 100 and the training exercises that are performed. Control/monitoring system 106 is capable of controlling and/or monitoring one or more functions of attack system 110 and target system 112, and is also capable of configuring these systems prior to initiation of training exercises. Control/monitoring system 106 includes one or more control machines 105A-105N. In one embodiment, control machines 105A-105N each comprise physical machines within control/monitoring system 106, while in another embodiment, control machines 105A-105N each comprise virtual machines that are part of, and operate within, control/monitoring system 106. Control/monitoring system 106 includes one or more network bridge devices 107A-107N. In one embodiment, network bridge devices 107A-107N each comprise virtual bridges that are part of, and operate within, control/monitoring system 106.

Attack system 110 is configured to initiate one or more simulated attacks of target system 112. Attack system 110 includes one or more attack machines 109A-109N. In one embodiment, attack machines 109A-109N each comprise physical machines within attack system 110, while in another embodiment, attack machines 109A-109N each comprise virtual machines that are part of, or operate within, attack system 110. Attack system 110 includes one or more network bridge devices 113A-113N. In one embodiment, network bridge devices 113A-113N each comprise virtual bridges that are part of, and operate within, attack system 110. Similarly, target system 112 includes one or more target machines 111A-111N. In one embodiment, target machines 111A-111N each comprise physical machines within target system 112, while in another embodiment, target machines 111A-111N each comprise virtual machines that are part of, or operate within, target system 112. Target system 112 includes one or more network bridge devices 115A-115N. In one embodiment, network bridge devices 115A-115N each comprise virtual bridges that are part of, and operate within, target system 112.

During a given training exercise within training environment 100, scenario traffic is exchanged between control/monitoring system 106, attack system 110, and target system 112. For example, control/monitoring system 106 may send configuration information as scenario traffic to attack system 110 and/or target system 112. Attack system 110 may send scenario traffic in the form of attack information to target system 112, and target system may send response or other scenario traffic back to attack system 110. In one embodiment, scenario traffic that is exchanged between control/monitoring system 106, attack system 110, and target system 112 is exchanged across a first communication channel. In one embodiment, this first communication channel may utilize one or a mix of physical and virtual networking that are set up for sending or receiving scenario traffic on control/monitoring system 106, attack system 110, and target system 112. Physical network cards and crossover cables may link physical machines, and virtual network interfaces and virtual bridges may link virtual machines inside a physical machine.

Scenario traffic, in one embodiment, includes both hostile and benign background traffic. For example, attack system 110 may send both hostile and benign traffic to target system 112 during the course of an exercise. The trainee may be responsible for correctly identifying and discriminating between the hostile and benign traffic in order to properly defend target system 112.

During the same training exercise within training environment 100, out-of-band data is also exchanged between control/monitoring system 106, attack system 110, and target system 112. This out-of-band data may include observation and control data. In one embodiment, the out-of-band data is not visible to a trainee and does not interfere with scenario traffic that is exchanged between systems 106, 110, and 112. Control/monitoring system 106 may monitor and observe the progress, events, responses, or status of attack system 110 and target system 112 by processing portions of the out-of-band data. Both attack system 110 and target system 112 transmit out-of-band data pertaining to the training exercise to control/monitoring system 106 for processing. Control/monitoring system 106 may also provide control information to attack system 110 and target system 112 as out-of-band data. For example, based upon observation of a training exercise by control/monitoring system 106, control/monitoring system 106 may modify one or more aspects of the exercise by sending control information to one or both of attack system 110 and target system 112 using out-of-band data. In one embodiment, out-of-band that is exchanged between control/monitoring system 106, attack system 110, and target system 112 is exchanged across a second communication channel that is separate and distinct from a first communication channel that is used to exchange scenario traffic between the systems. In one embodiment, this second communication channel for out-of-band data may utilize predefined or preconfigured ports that are set up for sending or receiving out-of-band data on control/monitoring system 106, attack system 110, and target system 112. For example, control/monitoring system 106 may use a predefined physical (e.g., serial) or logic port that is reserved for sending or receiving out-of-band data.

In one embodiment, attack system 110 is capable of dynamically and/or intelligently responding to actions taken by target system 112. For example, if, in one training scenario or exercise, attack system 110 initiates one type of simulated attack, such as a denial-of-service attack, on target system 112, a trainee of trainee device 108 that is communicatively coupled to target system 112 may cause target system 112 (along with one or more of its target machines 111A-111N) to respond, or take action, in a particular fashion in an attempt to handle the denial-of-service attack. After an exchange of scenario traffic between target system 112 and attack system 110, attack system 110 may use one or more of its attack machines 109A-109N to dynamically respond to the particular response, or action, that was taken by target system 112. In such fashion, attack system 110 is capable of adapting its behavior and attack actions based upon the responses of target system 112 using both scenario traffic data and out-of-band observation data. This functionality will be described in more detail below.

In one embodiment, control/monitoring system 106 provides at least partially automated evaluation and feedback control. During, or at the end of, a training exercise, training environment 100 is capable of providing evaluation and feedback to the trainee and/or to the instructor based upon actions taken and results achieved. Control/monitoring system 106 is capable of providing such feedback to trainee device 108 and/or instructor device 104, as will be described in more detail below.

Thus, training environment 100 may provide tactical-level training exercises for computer network defense activities. Potentially trainees may include network administrators, first responders, or digital forensics investigators. Training environment 100 may be used for various purposes, such as to train students, to test skills of applicants during examination, to evaluate certain network communication protocols, to rehearse certain scenarios, or to provide a training environment for team exercises.

Figure 1B:
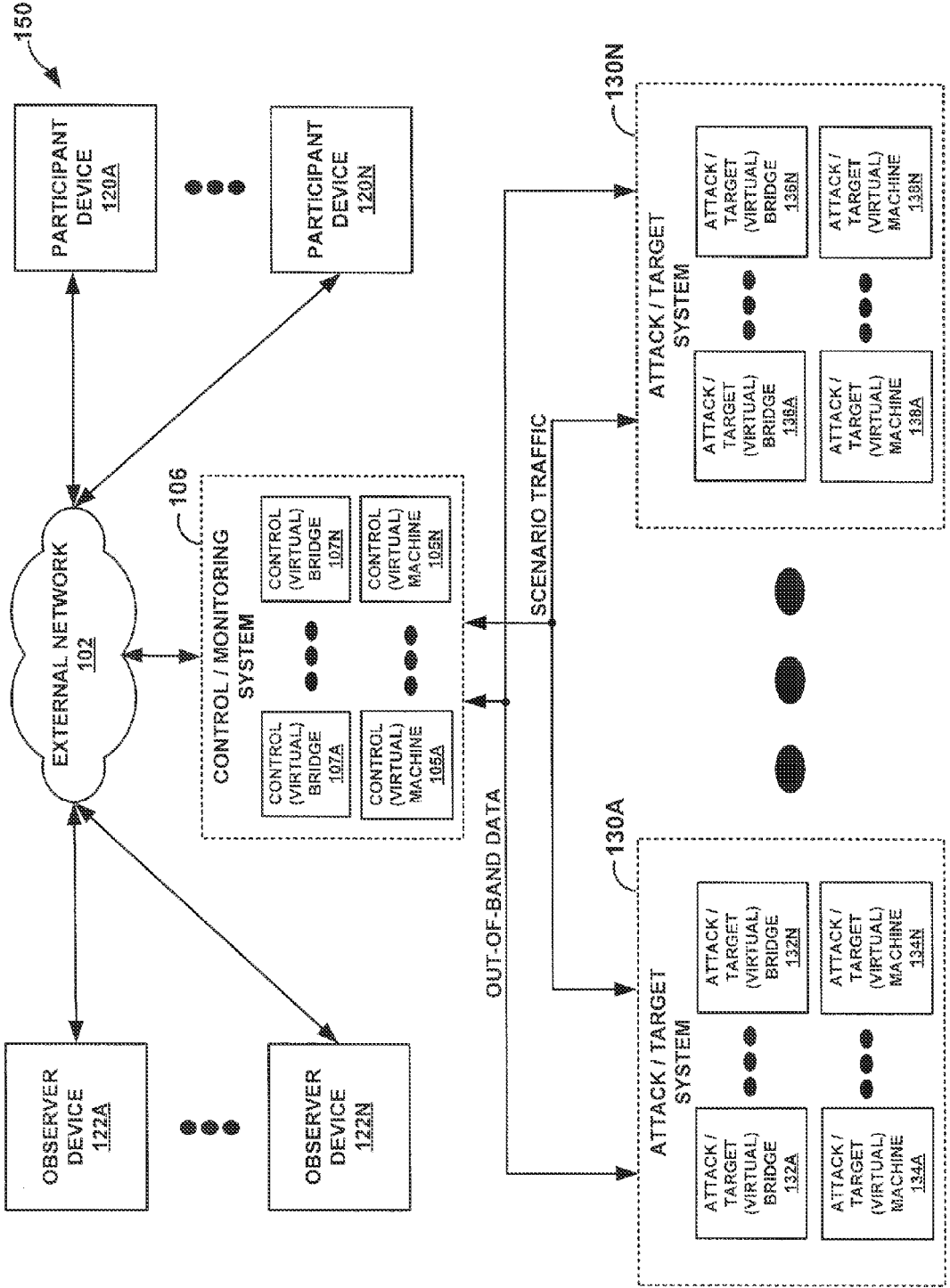
FIG. 1B is a block diagram of a more generalized training environment that includes a control/monitoring system and one or more attack/target systems, according to one embodiment.

FIG. 1B is a block diagram of a more generalized training environment 150 that includes a control/monitoring system 106 and one or more attack/target systems 130A-130N, according to one embodiment. In this embodiment, training environment 150 includes external network 102, control/monitoring system 106, one or more observer devices 122A-122N, one or more participant devices 120A-120N, and one or more attack/target systems 130A-130N.

Participant devices 120A-120N include devices, such as computing devices, that may be used by human participants, such as trainees. Observer devices 122A-122N include devices, such as computing devices, that may be used by human observers, such as instructors. Thus, in training environment 150 shown in FIG. 1B, one or more human participants and one or more human observers may connect to control/monitoring system 106 and attack/target systems 130A-130N by way of external network 102.

In one embodiment, training environment 150 may comprise a fully automated environment, in which there are no human participants or trainees. In this embodiment, participant devices 120A-120N would not necessarily be present in, or coupled to, training environment 150.

Training environment 150 also includes one or more attack/target systems 130A-130N. Each individual attack/target system 130A-130N may comprise an attack system, a target system, or both. An attack system is capable of attacking a target system, which is to be defended. When one of attack/target systems 130A-130N comprises both an attack and a target system, it is capable of attacking itself, such as in the case of an insider attack. Thus, in various different scenarios, an attack may be an external or insider attack.

In the example of FIG. 1B, attack/target system 130A includes one or more attack/target virtual bridges 132A-132N and one or more attack/target virtual machines 134A-134N. Attack/target virtual bridges 132A-132N may, for example, include functionality of an attack virtual bridge (e.g., attack virtual bridge 113A) and/or a target virtual bridge (e.g., target virtual bridge 115A). Attack/target virtual machines 134A-134N may, for example, include functionality of an attack virtual machine (e.g., attack virtual machine 109A) and/or a target virtual machine (e.g., target virtual machine 111A). Similarly, attack/target system 130N shown in FIG. 1B also includes one or more attack/target virtual bridges 136A-136N and one or more attack/target virtual machines 138A-138N.

When one or more participant devices 120A-120N are used within training environment 150, one or more human participants may engage in a training exercise to access any of attack/target systems 130A-130N. Thus, one or more human participants may defend one or more of attack/target systems 130A-130N, attack one or more of attack/target systems 130A-130N, or both.

Human participants may compete with or engage against each other. Human participants may also compete with or engage against one or more automated participants, as well. Thus, in one scenario, a human participant (using, for example, participant device 120A) may defend attack/target system 130N against an attack initiated by an automated participant controlling attack/target system 130A. In another scenario, a human participant use attack/target system 130N to attack attack/target system 130A that is being defended by an automated participant. Automated participants are controlled and monitored by control/monitoring system 106, according to one embodiment. Control/monitoring system 106 is also capable of monitoring out-of-band data and scenario traffic during one or more scenarios of a training exercise.

In certain scenarios, training environment 150 may provide fully automated attack and defense functions. In some cases, one or more human observers (using one or more of observer devices 122A-122N) may wish to evaluate the automated protocols used in such situations to critique, evaluate, or improve the automated functionality. In these cases, automated participants control attack/target systems 130A-130N during training exercises. Control/monitoring system 106 may be used to manage or otherwise control the automated participants, and may set and clean up the training exercises.

As noted above, attacks may comprise both external and insider attacks. Thus, for example, attack/target system 130A may be attacked in an external attack, such as by attack/target system 130N. However, in another case, attack/target system 130A may be attacked by itself (e.g., in an insider attack). A human participant may serve as an attacker, a defender, or both. An automated participant may server as an attacker, a defender, or both.

Figure 2A:
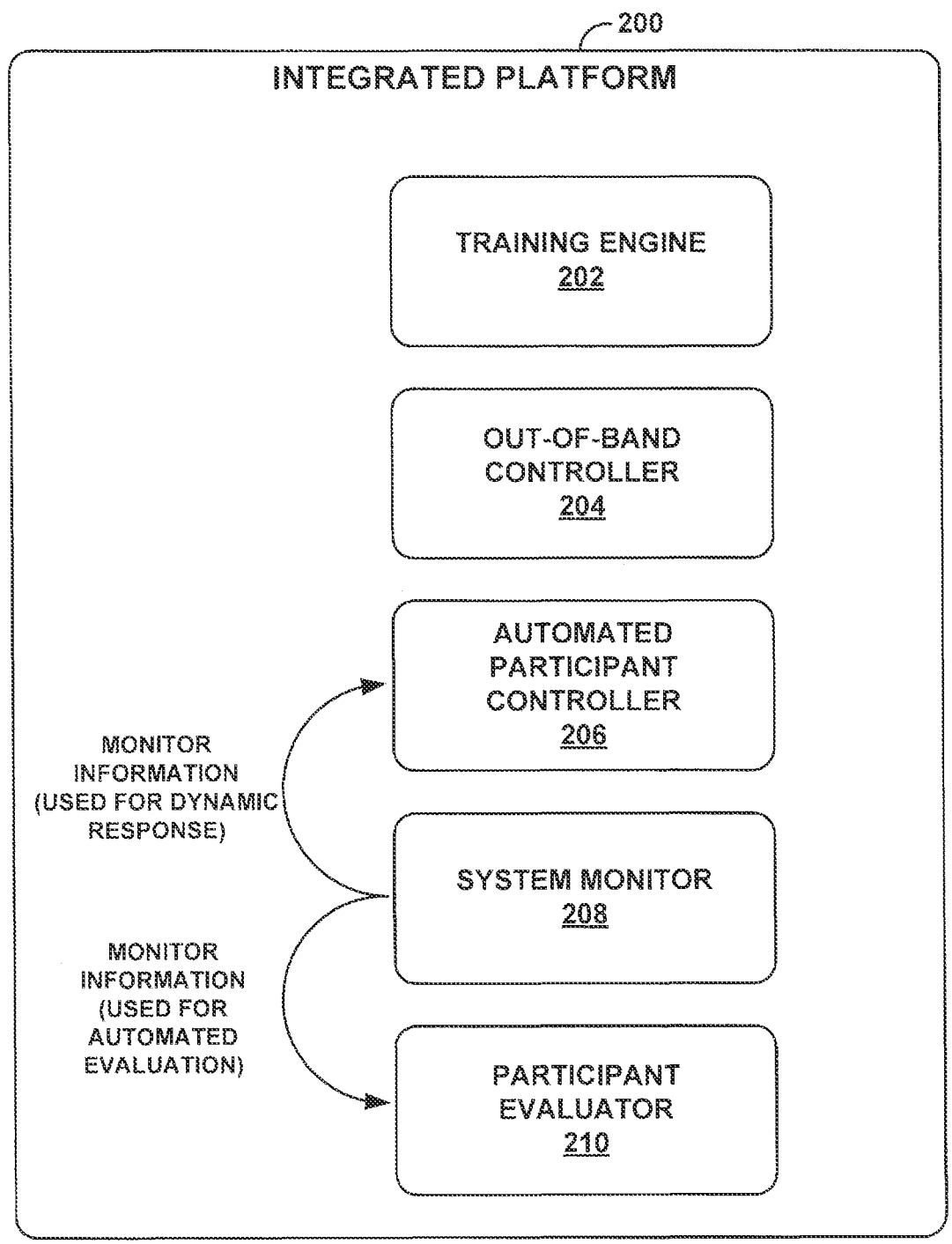
FIG. 2A is a block diagram illustrating an integrated platform that may be used within the training environments shown in FIGS. 1A and 1B, according to one embodiment.

FIG. 2A is a block diagram illustrating an integrated platform 200 that may be used within the training environments 100 and 150 shown in FIGS. 1A and 1B, according to one embodiment. As is shown in FIG. 2A, integrated platform 200 includes a training engine 202, an out-of-band controller 204, an automated participant controller 206 (such as an attack generator), a system monitor 208, and a participant evaluator 210 (such as a trainee evaluator). One or more components 202, 204, 206, 208, and 210 of integrated platform 200 may be used or otherwise implemented by control/monitoring system 106, attack system 110, and target system 112 during one or more training exercises in training environment 100. (If platform 200 were used in training environment 150 shown in FIG. 1B, it may be used or otherwise implemented by control/monitoring system 106 and attack/target systems 130A-130N during training exercises.)

The functionality provided by integrated platform 200, along with functionality provided by training engine 202, out-of-band controller 204, automated participant controller 206, system monitor 208, and participant evaluator 210 may be distributed amongst the various machines, such as, for example, machines 105A-105N (control/monitoring system 106), 109A-109N (attack system 110), and 111A-111N (target system 112). By using a common operational platform within training environment 100, for example, control/monitoring system 106, attack system 110, and target system 112 are capable of providing integrated and distributed support of training exercises. (Similarly, by using a common operational platform within training environment 150, control/monitoring system 106 and systems 130A-130N are capable of providing integrated and distributed support of training exercises.) Training engine 202, out-of-band controller 204, automated participant controller 206, system monitor 208, and participant evaluator 210 are capable of communicating with each other and exchanging information during training exercises.

Training engine 202 provides a virtual environment in which training scenarios and exercises are executed, such as in an automated fashion. In one embodiment, training engine 202 is built from a virtual network of virtual machines, overlaid on a physical network of physical hosts. Training engine 202 provides, in one embodiment, the network topology of target machines 111A-111N and target bridges 115A-115N of target system 112. Training engine 202 provides, in one embodiment, the network topology of attack machines 109A-109N and attack bridges 113A-113N. Training engine 202 provides, in one embodiment, control/monitoring system 106 in one or more of control machines 105A-105N and control bridges 107A-107N, which may comprise virtual machines. Training engine 202, in one embodiment, is linearly scalable, heterogeneous, and recoverable from errors due to mistakes or intentional misuse. It may be easily configured and managed through a GUI (graphical user interface) front-end interface to which virtualization-level details are transparent. Training engine 202 also provides ease of customization and the ability to be isolated when executing potentially dangerous scenarios.

Out-of-band controller 204 provides for control and observation of training exercises. This controller 204 does not interfere with scenario traffic, according to one embodiment, and also minimizes visibility of control and observation activities from the trainee's point of view. The out-of-band mechanism implemented by out-of-band controller 204 includes a physically separate network, external console access to machines or virtual machines (such as (virtual) machines 105A-105N, 109A-109N, or 111A-111N) via ports (such as virtual or physical serial ports), and a scheduler that mediates multiple access requests to machines. In one embodiment, the scheduler also incorporates an API for communicating with heterogeneous machines or virtual machines. Thus, in one embodiment, out-of-band controller 204 may be implemented on and between each of attack system 110, target system 112, and control/monitoring system 106. Out-of-band controller 204 also provides the ability to maintain control of network and host components within training environment 100 in the event of primary network failure. (Out-of-band controller 204 provides similar functionality within training environment 150.)

Automated participant controller 206 provides automated execution of scenarios, such as attack or even defensive scenarios, of an arbitrary degree of complexity, according to one embodiment. Coupled with the results of system monitor 208 (described in more detail below), automated participant controller 206 has the ability to provide dynamic responses to the trainee's actions. Automated participant controller 206 includes a virtual network of machines (such as machines 109A-109N of attack system 110), a collection of attack tools, and a rule base that implements the attack logic located within control/monitoring system 106, according to one embodiment. Thus, in training environment 100, automated participant controller 206 may be implemented within attack system 110 and control/monitoring system 106.

Automated participant controller 206 is also capable of providing benign background network traffic (such as during attacks), providing a "wheat vs. chaff" distinction to make the scenario more realistic to the trainee. In one embodiment, automated participant controller 206 uses virtual machines (such as machines 109A-109N, when such machines comprise virtual machines) bound to multiple IP (Internet Protocol) addresses. IP spoofing, and multiple virtual routers to provide Internet attacks and to provide realistic trace-back capabilities and allow counter-attacks from the target system 112. Scenario logic implemented by automated participant controller 206, such as attack scenario logic, is parameterized to provide randomness as an anti-cheat measure, and to allow instructors to tune scenarios to an appropriate level of difficulty.

In one embodiment, integrated platform 200 supports dynamic changes to scenarios generated by automated participant controller 206, both in terms of progression (such as attack progression) and for evaluation purposes. Dynamic responses generated by automated participant controller 206 may be based on more than just responses created from one or more stock templates. Rather, automated participant controller 206 recognizes parameters of the system state and responds accordingly. For example, if a user takes action to try and repair a network problem and restore performance, automated participant controller 206 can recognize the change and respond accordingly (such as, for example, by launching a more complex attack).

Figure 2B:
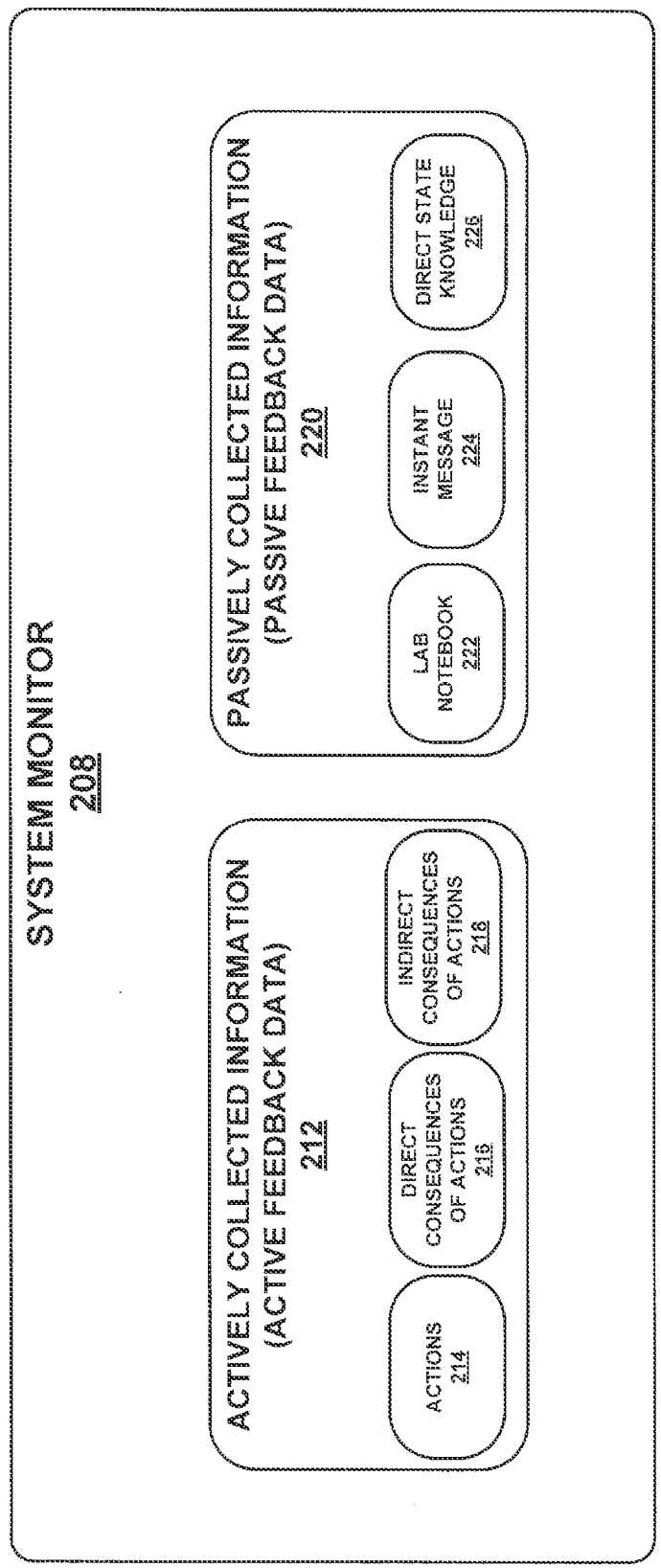
FIG. 2B is a block diagram illustrating additional details of the trainee evaluator shown in FIG. 2A, according to one embodiment.

For example, automated participant controller 206 may use monitor information provided by system monitor 208 to generate dynamic responses to a trainee's actions. FIG. 2B is a block diagram illustrating further details of system monitor 208, according to one embodiment.

In FIG. 2B, system monitor 208 contains and manages actively collected information 212 (active feedback data) and passively collected information 220 (passive feedback data). In one embodiment, control/monitoring system 106 manages system monitor 208. Actively collected information 212 may include information about a trainee's actions 214 (such as logs of the trainee's activities or user history), the direct consequences 216 of the trainee's actions on system state, and the indirect consequences 218 of the trainee's actions as captured by system metrics. This type of information may be collected, for example, by gathering data directly from machines (such as machines 109A-109N and/or 111A-111N) or from out-of-band data transferred between control/monitoring system 106 and one or more attack/target systems (such as attack system 110 and target system 112). Out-of-band controller 204, which may be operable on one or more of the systems, helps manage the flow of such out-of-band data in these instances.

Passively collected information 220 includes information related to direct state knowledge 226 based upon receipt of information from automated participant(s) (such as by knowing an automated attacker's state), and also includes observations and conclusions from human participant(s) within lab notebook data 222 and instant message information 224. A trainee's state of mind includes the trainee's observations and conclusions during an exercise. This type of information is gathered using a generalized "electronic lab notebook," similar in concept to incident reports commonly used by security professionals, according to one embodiment. The lab notebook may provide both novice and expert interfaces, which are linked to a back-end database that ensures data integrity and supports the queries necessary for auto-evaluation, according to one embodiment. This back-end database may be housed in control/monitoring system 106. Mechanisms may be included within participant evaluator 210 to check the appropriateness of the trainee's observations, the reasonableness of the trainee's conclusions, and/or the correctness of both based upon, or according, to the training scenario. In one embodiment, the electronic notebook is displayed to the trainee via trainee device 108, and gathered information is then provided to control/monitoring system 106. In one embodiment, the format of the lab notebook is generalized to avoid providing clues to the trainee yet structured to allow the trainee's entries to be machine-parseable. Instant message information 224 includes information gathered from instant messages sent or received by participants (such as a trainee or automated participant) during training exercises. These messages may contain observations or conclusions that can be used both by automated participant controller 206 and/or participant evaluator 210.

In one embodiment, passively collected information 220 may be collected, for example, by gathering data directly from machines (such as machines 109A-109N and/or 111A-111N) or from out-of-band data transferred between control/monitoring system 106 and one or more attack/target systems (such as attack system 110 and target system 112). Out-of-band controller 204, which may be operable on one or more of the systems, helps manage the flow of such out-of-band data in these instances.

In one embodiment, system monitor 208 is implemented in control/monitoring system 106, and is capable of providing automated participant controller 206 with monitor information to cause automated participant controller 206 to dynamically respond to the trainee's actions. The monitor information may include one or more portions of actively collected information 212 and/or one or more portions of passively collected information 220. In doing so, automated participant controller 206 may adapt its responses to trainee's actions. In one embodiment, system monitor 208 may also be partially implemented within target system 112, or within one or more of attack/target systems 130A-130N.

Participant evaluator 210 is an auto-assessment system to provide both real-time feedback to trainees during exercises and evaluation results to instructors. In one embodiment, participant evaluator 210 collects multiple types of assessment data about the trainee during a training exercise, including information about the trainee's actions as well as information about the trainee's state of mind (e.g., situational awareness and the diagnostic process), as recorded by the trainee during the exercise. In addition to using assessment data for auto-evaluation purposes, the system also saves a log of all collected data as an audit record, allowing students to appeal auto-evaluation results, if necessary (according to one embodiment). Participant evaluator 210 is also able to respond with hints if the trainee is not making sufficiently rapid progress in countering an attack, according to one embodiment.

In one embodiment, participant evaluator 210 uses monitor information provided by system monitor 208 (which may include one or more portions of actively collected information 212 and/or one or more portions of passively collected information 220) to provide automated evaluation functionality. Thus, participant evaluator 210 may use actively collected information 212 and/or passively collected information 220. In one embodiment, participant evaluator 210 is capable of monitoring, and also recording, various aspects of the trainee's performance during a training exercise. Participant evaluator 210 is capable of evaluating both the performance of human participants as well as the performance of automated participants (such as an automated attacker or defender) during one or more training exercises. Performance evaluation of automated participants may aid in the evaluation of automated protocols that are used by such automated participants.

Figure 3:
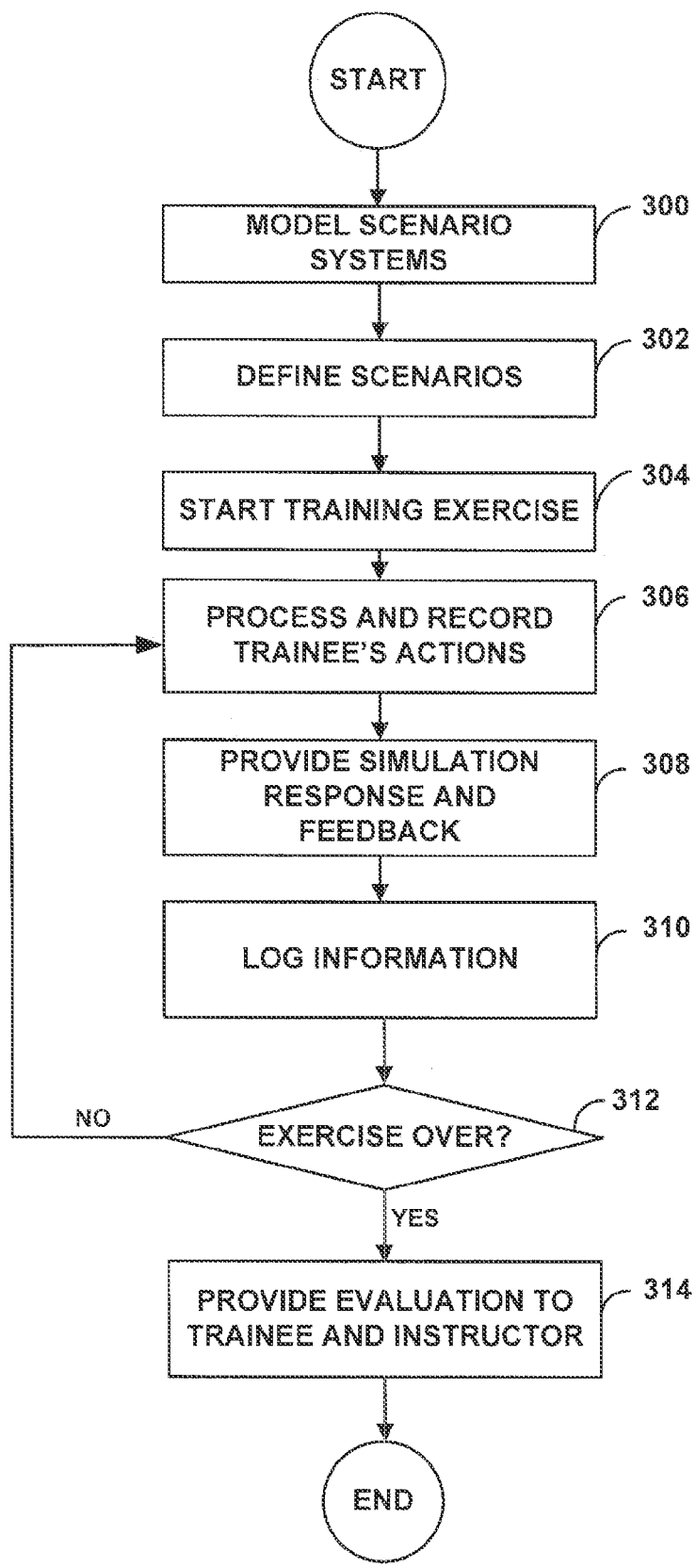
FIG. 3 is a flow diagram illustrating a method that may be performed by the training environments shown in FIGS. 1A and 1B, according to one embodiment.

FIG. 3 is a flow diagram illustrating a method that may be performed by the training environments 100 and 150 shown in FIGS. 1A and 1B, according to one embodiment. For example purposes only in the description below, it will be assumed that the method is performed by training environment 100. The method includes acts 300, 302, 304, 306, 308, 310, and 314, and also includes a checkpoint 312.

In act 300, target system 112 and attack system 110 are modeled, such as by training engine 202 (FIG. 2A). Target system 112 is the system that is to be defended by the trainee, according to one embodiment. Attack system 110 is the system that generates attacks and benign background traffic against the target system 112. Thus, in this embodiment, systems specific to exercise scenarios (i.e., 112 and 110) are modeled. Systems 112 and 110 may be modeled to include various machines, bridges, network connections, or other components. Control/monitoring system 106 is capable of instantiating target system 112. In one embodiment, an instructor using instructor device 104 may provide instructions or other information that is used during the modeling process. In some cases, the trainee (using device 108) may also be permitted to participate in the modeling process.

In act 302, training exercise scenarios are defined. These may be defined by participant evaluator 210 and/or automated participant controller 206. The scenarios may be stored on control/monitoring system 106 and/or attack system 110. Any given training exercise may include one or more training scenarios. These scenarios may include various scenarios in which attack system 110 engages in an attack of target system 112. Control machines 105A-105N, attack machines 109A-109N, and/or target machines 111A-111N may participate in the execution of these scenarios, such as automated execution.

In one embodiment, environment implements free-form exercises. In this embodiment, training environment 100 supports defining and executing a scenario as a state machine with rules that get mapped into real actions inside of a virtual machine. (As already described, any of machines 105A-105N, 109A-109N, and/or 111A-111N may comprise virtual machines, according to one embodiment.) The concept supports multi-staged attacks and attack changes that can be made in response to "real" user actions.

In act 304, the training exercise starts within training environment 100. In act 306, the trainee's actions are processed. As described previously, the trainee uses trainee device 108 during the training exercise to perform actions on target system 112. These actions are processed during act 306. In one embodiment, these actions are processed by one or more of control machines 105A-105N, and may also be processed by one or more of attack machines 109A-109N. These actions may be captured, recorded, or otherwise stored in one or more databases as an audit log, and may also be monitored by control/monitoring system 106 by way of out-of-band data that is transmitted to control/monitoring system 106 from target system 112 using out-of-band controller 204. Actual scenario traffic may be transmitted by target system 112 to attack system 110. In addition to training environment 100 recording this information, which is based upon the trainee's actions, the trainee may also record feedback in the trainee's electronic notebook. For example, the trainee may record observations and conclusions throughout the course of the exercise. This feedback recorded by the trainee may also be processed during act 306.

In act 308, automated participant controller 206 provides a response to trainee's actions. In one embodiment, one or more of attack machines 109A-109N of attack system may provide a dynamic, automated response, and send corresponding scenario traffic from attack system 110 to target system 112. In one embodiment, automated participant controller 206 uses a state machine to process actions taken by the trainee in order to determine an intelligent and dynamic response.

In act 310, integrated platform 200 logs, or records, information about the actions taken and responses generated. Automated participant controller 206 and/or participant evaluator 210 may log such information in control/monitoring system 106. This information may be provided as results and feedback to the trainee and/or the instructor, as described below. At checkpoint 312, automated participant controller 206 determines whether or not the exercise has completed, or whether one or more exercise scenarios are still in process. If the exercise is not yet over, control returns to act 306, where the trainee's actions are again processed and recorded. If, however, the exercise is over, the trainee's performance is evaluated in act 314.

In act 314, a performance evaluation may be provided to the trainee and/or instructor. In one embodiment, participant evaluator 210 (FIG. 2A) provides this evaluation, which may include an automated evaluation that is generated and provided by control/monitoring system 106. In certain cases, an instructor using instructor device 104 may also contribute evaluation feedback for the trainee. The evaluation may be based upon the record of the trainee's actions (such as in an audit log) and also the record created in the trainee's electronic notebook, according to one embodiment.

Figure 4:
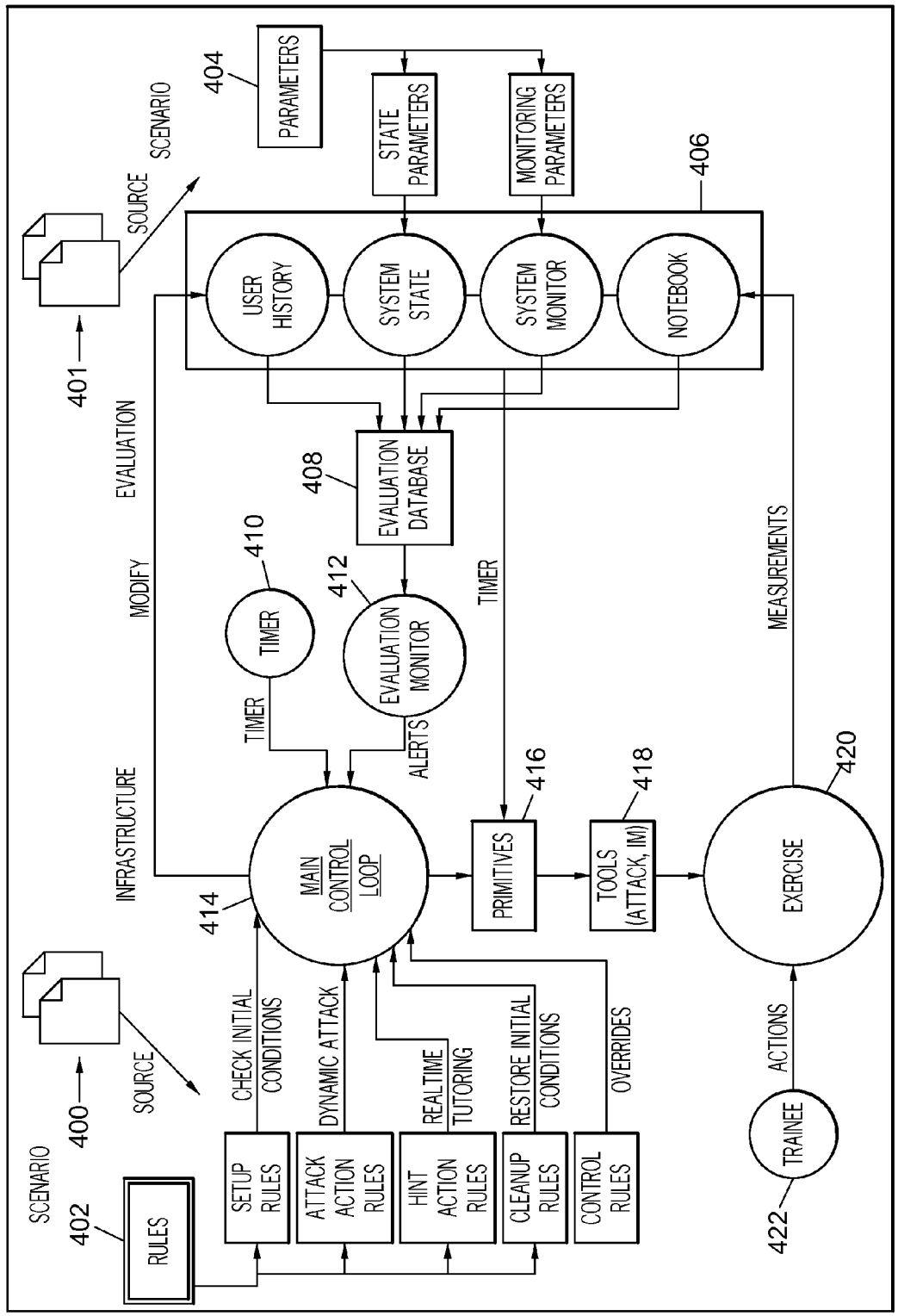
FIG. 4 is a block diagram illustrating various rules, processes, and other information that may be used by the integrated platform provided by the training environments shown in FIGS. 1A and 1B, according to one embodiment.

FIG. 4 is a block diagram illustrating various rules, processes, and other information that may be used by the integrated platform 200 (FIG. 2A) provided by training environments 100 and 150 shown in FIGS. 1A and 1B, according to one embodiment. For example purposes only in the description below, it will be assumed that the various rules, processes, and other information used by platform 200 is provided by training environment 100.

FIG. 4 shows various source documents 400 that may be used by training engine 202 and/or automated participant controller 206 to create one or more rules 402 for training scenarios. A training exercise 420 for a trainee 422 may comprise one or more such scenarios. Rules 402 may be implemented by one or more of control/monitoring system 106, attack system 110, and target system 112 in setting up or executing any given scenario, and are utilized by a main control loop 414. Source documents 401 may be used by training engine 202 and/or automated participant controller 206 to provide one or more parameters 404 used for monitoring performance metrics the training scenarios and tracking their formal state. In one embodiment, source documents 400 and 401 may be predefined documents managed by control/monitoring system 106, but that may be further customized by an instructor using instructor device 104. Various different source documents 400 and 401 may be used within training environment 100, and these documents 400 and 401 may be configured or modified by an instructor to alter rules 402 and parameters 404 that are used when executing one or more scenarios of exercise 420.

Example rules 402 are shown in FIG. 4. Setup rules are rules that may be used in setting up a scenario, such as initial conditions of a scenario. Attack action rules are rules that are used to initiate and sustain an attack by attack system 110 against target system 112. Hint action rules are rules that may be used to provide real-time hints to a trainee during one or more of the scenarios. These hints may provide tutoring if the trainee 422 is struggling to implement appropriate corrective or preventive actions during exercise 420.

Cleanup rules are rules that may be used at the end of a scenario or exercise 420 to perform cleanup operations and restore initial conditions or any state machines that are used. Control rules are rules that may be implemented by control/monitoring system 106 to control the meta-state of an operational scenario for exercise 420, such as error handling or overriding other types of rules.

As shown in FIG. 4, rules 402 are read and implemented (when rule preconditions are met) by main control loop 414, which may comprise the main control loop for one or more scenarios of training exercise 420. In one embodiment, main control loop 414 provides a state machine that uses rules 402 when determining responsive actions that are to be taken by automated participant controller 206. In one embodiment, main control loop 414 may be executed by automated participant controller 206, which may be implemented on one or more of control/monitoring system 106 and attack system 110. A timer 410 may be used by main control loop 414 during exercise 420. Main control loop 414 may use timer 410 to time certain events or responses that occur during exercise 420.

In addition, FIG. 4 shows example parameters 404. Parameters 404 may include state parameters (to track the formal state of an exercise) and monitoring parameters (to monitor performance metrics within an exercise) that are used by one or more of processes 406. Processes 406 include a process to monitor and record history of actions performed by trainee 422. This process may provide an audit log of actions performed and corresponding results that are stored within evaluation database 408. Processes 406 further include a process to track state for system 106, 110, or 112, and also a process to monitor metrics for system 106, 110, or 112. These processes use state parameters and monitoring parameters as input. Processes 406 also include a process for providing an electronic notebook that trainee 422 may use to record observations and conclusions during exercise 420. Processes 406 may be executed on each of control/monitoring system 106, attack system 110, and target system 112 by training engine 202 and/or participant evaluator 210, which may be implemented on one or more machines of these systems. Input, or measurements, generated during execution of exercise 420 may also be provided as input to processes 406, as shown in FIG. 4. Output or results generated by each of processes 406 may be captured and stored in evaluation database 408.

Participant evaluator 210, which may be implemented on control/monitoring system 106, according to one embodiment, uses an evaluation monitor 412 to monitor relevant changes within the exercise as detected by the evaluation processes 406. Processes 406 may each record information within an evaluation database 408 (including audit log information of actions performed by trainee 422), which is, in one embodiment, stored on control/monitoring system 106. Evaluation monitor 412 uses information stored in evaluation database 408 during the evaluation process, and may provide alerts to main control loop 414 to cause main control loop 414 to dynamically respond to an action by trainee 422. In one embodiment, direct actions, direct and indirect results of actions, and notebook entries recorded by trainee 422 are captured in evaluation database 408. By using information contained within database 408, monitor 412 can cause automated participant controller 206, which may be implemented on attack system 110, to dynamically respond to actions taken by trainee 422 during exercise 420 or to provide hints to trainee 422. In addition, information from database 408 may be used at the end of exercise 420 to evaluate the overall performance of trainee 422, and provide an automated evaluation report, which may include a grade for the trainee, and suggestions for improvement.

Tools 418 represent various commodity tools that the main control loop 414 may use to effect change within training exercise 420 according to rules 402. For example, main control loop 414 may use an instant message (IM) program to exchange IMs with the trainee. In certain cases, IMs may be automatically generated by control/monitoring system 106 during an exercise and sent to trainee 422 to provide status information or ask questions for evaluation. In some cases, the IMs (sent either automatically from control/monitoring system 106 or from an instructor directly) may even include hints that can be used by the trainee 422 during a given scenario. In one embodiment, trainee 422 is able to exchange IMs with other trainees during group exercises. In such fashion, trainee 422 may collaboratively work with other individuals or trainees during exercise 420 to address certain issues or problems.

Others tools may also be included within tools 418, which may be used by trainee 422. For example, main control loop 414 may use command shell programs or packet sniffers during exercise 420 as part of an attack. Since tools 418 are commodity software with human-driven interfaces, primitives 416 are provided as an advanced programming interface (API) to allow main control loop 414 to invoke tools 418.

Figure 5A:
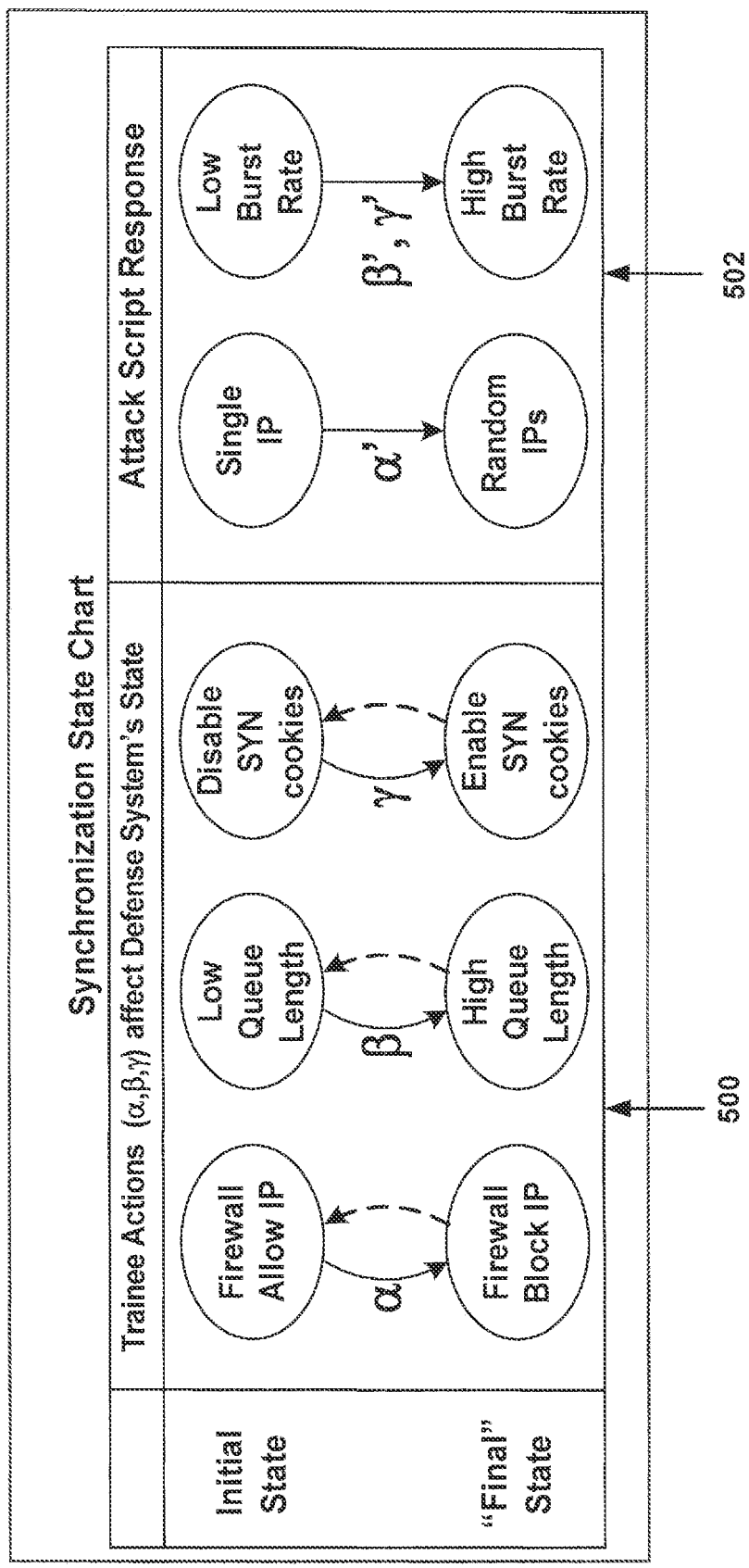
FIGS. 5A-5B are conceptual diagrams illustrating actions and corresponding responses that may be taken by one or more of the systems within the training environments shown in FIGS. 1A and 1B, according to one embodiment.
Figure 5B:
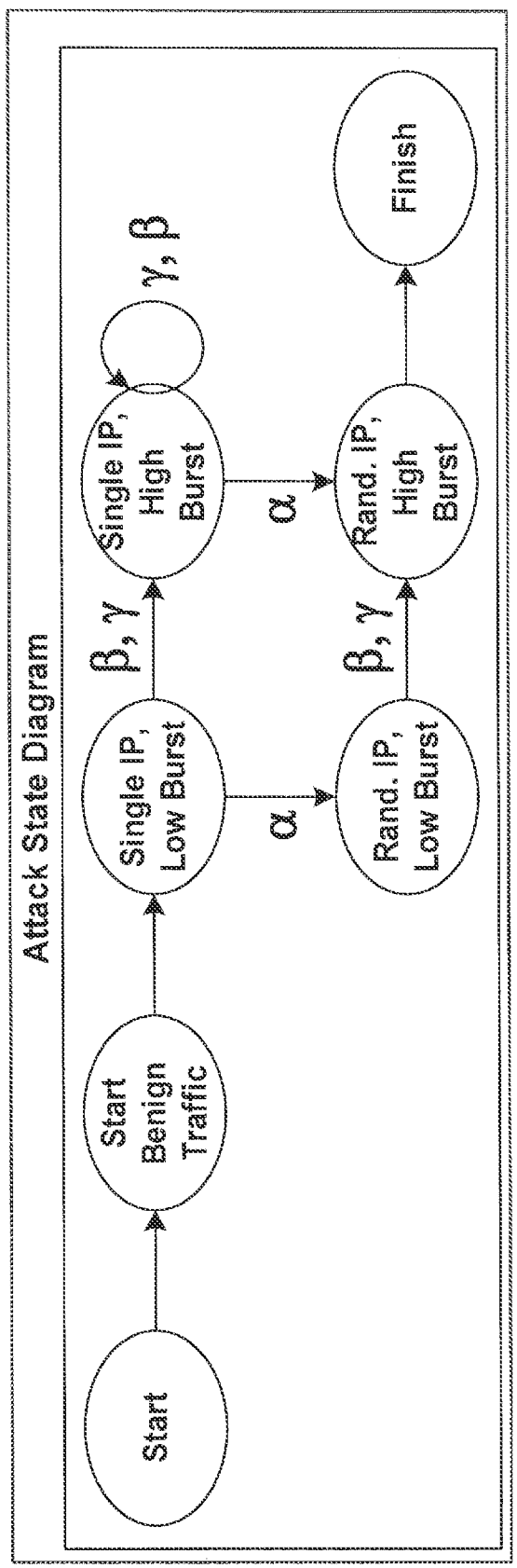

FIGS. 5A-5B are conceptual diagrams illustrating actions and corresponding responses that may be taken by one or more of the systems, such as systems 110 and 112, within training environments 100 and 150 shown in FIGS. 1A and 1B, according to one embodiment. For example purposes only in the description below, it will be assumed that training environment 100 is used.

In FIGS. 5A-5B, it is assumed that an example training exercise is to be executed that includes one or more scenarios related to a denial-of-service (DoS) attack by attack system 110 against target system 112. For example, the DoS attack may start as a single-source attack against one server, but may be upgraded to a distributed DoS attack depending on actions performed by the trainee. Target machines 111A-111N may each model one or more servers in the exercise.

In this example, attack system 110 may provide an attack network that controls one or more of attack machines 109A-109N to route traffic between attack system 110 and target system 112. Attack machines 109A-109N may route both malicious traffic and also benign background traffic. In this example, benign traffic remains at a constant level but malicious traffic patterns are changed. Target system 112 may be modeled to include a firewall/router and multiple web servers in a subnet that are to be protected. As noted above, each component (e.g., router, server) may be modeled by one or more of target machines 111A-111N.

In the example of a DoS attack, the trainee may have various objectives or missions to complete during the exercise. For example, the trainee may need to detect the attack, and make specific observations about the attack. The trainee may also attempt to re-establish any lost connectivity, and block the attack at the firewall or at the web server sites. In addition, the trainee may also try to avoid taking any negative actions that break any existing connections. Actions taken by the trainee within the examples of FIGS. 5A-5B may occur within one or more of training engine 202, target system 112, and attack system 110, and be detected by one or more of participant evaluator 210 and control/monitoring system 106. Responses to trainee actions performed within the examples of FIGS. 5A-5B may be implemented by one or more of training engine 202 and automated participant controller 206 within one or more of the systems 106, 110, and 112 in training environment 100.

FIG. 5A shows an example synchronization state chart (i.e., how a change in state in one system causes a synchronized state change in another system). Portion 500 of the chart conceptually shows actions that may be taken by the trainee during this DoS attack exercise. These actions, which are labeled α, β, and γ, affect the state of target system 112 that is being protected. When the exercise begins, target system 112 has an initial state. In this initial state, target system 112 includes a firewall (implemented by one or more of machines 111A-111N) that allows communication from an external IP address provided by an attack machine 109A-109N of attack system 110. Target system 112 also includes a low queue length to process incoming traffic, and disables SYN cookies in the initial state. (SYN cookies are used to guard against SYN flood attacks when TCP (Transmission Control Protocol) connections are used.)

However, as noted above, the trainee can take one or more actions α, β, and γ during the course of the training exercise, which will affect the state of target system 112. Portion 500 of state chart shows a Final, or updated, state that results from the trainee taking one or more of these actions. For example, if the trainee performs action α to cause the firewall to block a particular IP address within attack system 112, the trainee has caused target system 112 to change state. If the trainee performs action β to cause the queue to have a high queue length, target system 112 accordingly has a new state. And, if the trainee performs action γ to enable SYN cookies, target system 112 will accordingly reflect this new state.

Portion 502 of the state chart shown in FIG. 5A shows the responses taken by the main control loop 414 as dictated by one or more attack rules 402 as implemented by attack system 110 in response to actions performed by the trainee. The synchronization of these responses to the trainee's actions are labeled by α', β', and γ' in portion 502. These responses affect the state of attack system 110. In an initial state, attack system 110 uses a single IP address (which may be implemented by one of attack machines 109A-109N) and uses a low burst rate of traffic for a DoS attack. If the trainee performs act α (which is to block traffic from the IP address), attack system 110 responds by performing response α', which causes attack system 110 to use multiple, random IP addresses during the attack (which may be associated with multiple machines 109A-109N). If the trainee performs act β and/or γ (to reconfigure one or more machines 111A-111N of target system 112), attack system 110 responds by performing response β' and/or γ', respectively, to change from a low burst rate to a high burst rate of traffic, for example.

In such fashion, attack system 110 is capable of dynamically and automatically responding to actions performed within target system 112 during the course of a DoS attack exercise. The trainee controls the target system 112 through commands and instructions that are provided by trainee device 108. Attack system 110 may initiate the attack in a particular fashion, but may intelligently respond to any corrective or preventive actions taken by target system 112 using response rules such as those shown in FIG. 5A. In one embodiment, attack system 110 may have different rule sets of varying difficulty levels. Thus, depending on the scenario or difficulty level selected by the instructor of trainee, attack system 110 may select an appropriate script to use during one or more scenarios of the training exercise.

FIG. 5B shows an example of a traditional state diagram that conceptually shows the attack responses of attack system 110 in response to actions taken by target system 112. This diagram conveys information similar to FIG. 5A but in a different format. FIG. 5B shows state transitions and responses within attack system 110 in response to actions α, β, and γ that may be taken by target system 112. Initially, attack system 110 starts by sending benign background traffic to target system 112. Then, attack system 110 starts sending initial malicious DoS traffic, comprising low-burst traffic from a single IP address associated with one of attack machines 109A-109N. If target system 112 performs act α in this state, to block traffic from the IP address, attack system 110 then moves to a new state to begin sending low-burst traffic from multiple random IP addresses that are associated with multiple attack machines 109A-109N. If, though, target system 112 performs acts β and/or γ in this state, to reconfigure one or more machines 111A-111N, attack system 110 moves to a state to send high-burst traffic from a single IP address.

To summarize FIGS. 5A-5B, if attack system 110 is in the state of sending low-burst traffic from multiple IP addresses, and target system 112 performs acts β and/or γ, as shown in FIG. 5B, attack system 110 responds by sending high-burst traffic from random, multiple IP addresses. If attack system 110 is in the state of sending high-burst traffic from a single IP address, and target system 112 performs act α, attack system 110 responds by sending high-burst traffic from random, multiple IP addresses. Thus, as the trainee uses trainee device 108 to defend target system 112 and cause target system 112 to perform various corrective or preventive actions, these actions are detected by participant evaluator 210, in turn triggering attack rules in automated participant controller 206 to cause attack system 110 to dynamically adapt its tactics during the DoS attack. Due to the ability of training environment 100 to respond dynamically to the actions performed by a trainee, the trainee is able to engage in "free play" activity during any given training exercise rather than conform to a "cookbook" exercise. The trainee may try to perform many different actions, without necessarily being limited by the type of actions performed, such that the trainee may engage in "free play". Attack system 110 is able to adapt its behavior based upon the actions taken by the trainee.

FIG. 6 is a screen diagram illustrating various training scenarios that may be executed with training environments 100 and 150 shown in FIGS. 1A and 1B, according to one embodiment. For example purposes only in the description below, it will be assumed that training environment 100 is used.

In the embodiment shown in FIG. 6, the screen displayed in FIG. 6 may be displayed to the trainee on trainee device 108 or to the instructor on device 104. In the example of FIG. 6, two scenarios are shown. These scenarios may correspond to one or more separate training exercises. By selecting one of the scenarios, the trainee or instructor may cause the selected scenario to be executed within training environment 100.

The first example scenario is a DoS attack scenario, similar to the one described above. The second example scenario is an AOC insider attack. Brief descriptions of each scenario are shown in FIG. 6, as well as date/timestamps of any prior executions of these scenarios.

Figure 7:
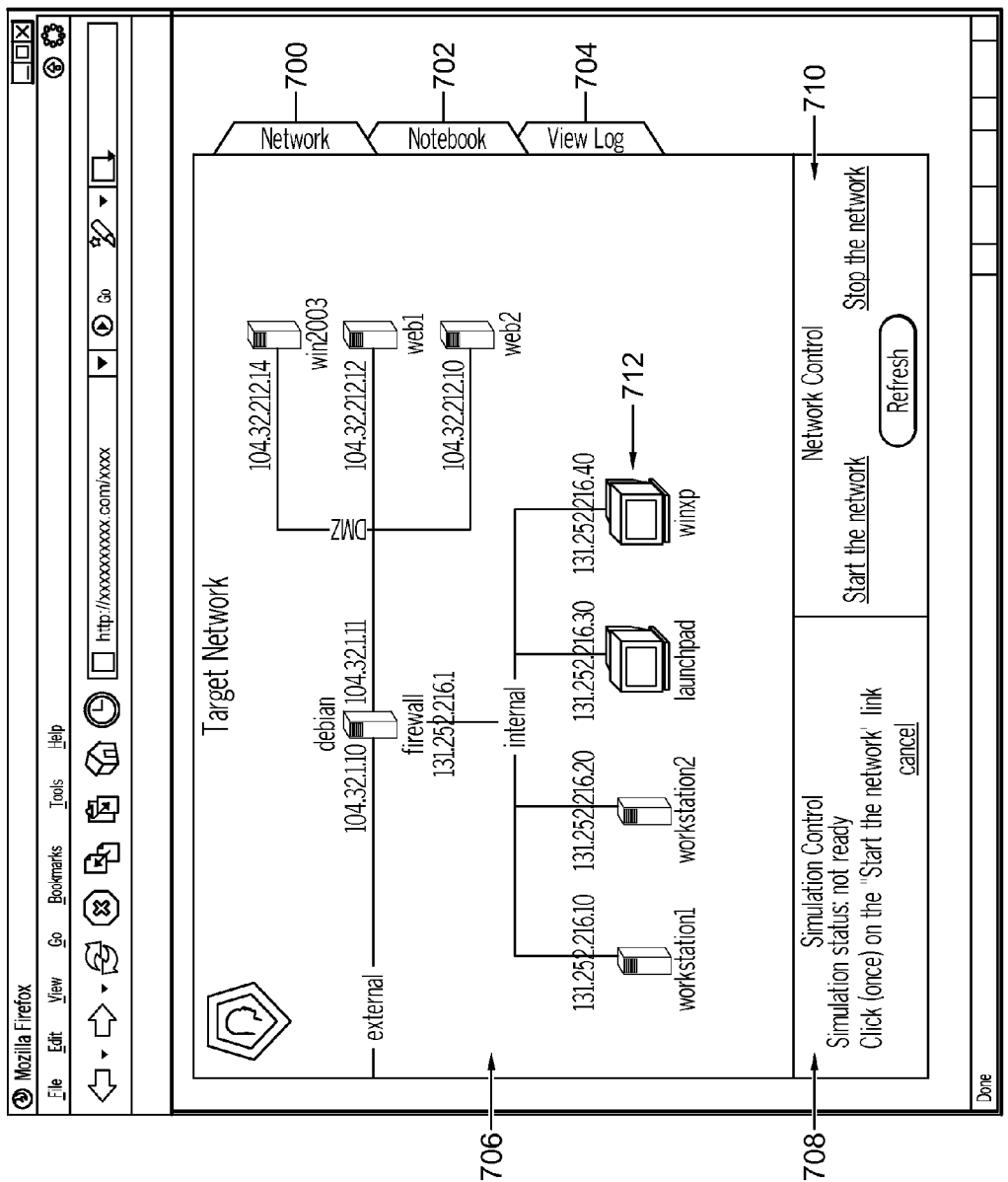
FIG. 7 is a screen diagram illustrating various details of a target network within one of the training environments shown in FIGS. 1A and 1B that is to be protected against attack, according to one embodiment.

FIG. 7 is a screen diagram illustrating various details of a target network within training environment 100 or 150 shown in FIGS. 1A and 1B that is to be protected against attack, according to one embodiment. For example purposes only in the description below, it will be assumed that training environment 100 is used.

In the embodiment shown in FIG. 7, the target network is a network implemented within target system 112, which is the subject of attack by attack system 110. The screen diagram shown in FIG. 7 may be displayed on trainee device 108 when the trainee is participating in an exercise or assisting in the modeling of the target network. It may also be displayed on instructor device 104 when the instructor assists in the modeling of target network. Modeling is performed by training engine 202 (FIG. 2A), according to one embodiment. In this embodiment, training engine 202 may be implemented on control/monitoring system 106.

The target network that is implemented within target system 112 may be modeled in many different ways, depending on the type of training scenario and/or exercise that is to be executed. In many cases, the instructor may model the target network to create the network that is to be protected by one or more trainees. However, in certain cases, a trainee may also assist in network modeling. For example, the trainee may wish to modify an existing modeled network in order to test different skills or scenarios. Training environment 100 provides a great deal of flexibility in defining scenarios and in modeling networks to be used in training exercises.

The target network shown in FIG. 7 is for example purposes only. The modeled network is displayed within screen area 706. A user, such as an instructor or trainee, may use an input device, such as a mouse or keyboard, to manipulate the network elements within screen area 706. The network elements include network connections, Ethernet bridges, firewall devices, web servers, workstations, or other computing devices. In one embodiment, the user may have a collection of displayed network elements that may be dragged-and-dropped into screen area 706. The user may position these elements in various locations, and may coupled, or otherwise interconnect, such elements together when modeling the overall target network.

The status of individual network elements may be displayed within screen area 706. In this example, certain labels (such as a certain color) associated with each network element may indicate that the element is powered down. When a network element is up and available, its label may change, such as to a different color. When a network element is in the process of booting up or shutting down, its label may again change, such as to a different color. Individual network elements may also be controlled within screen area 706 by a user clicking on their labels. In this example, clicking on a label turns the corresponding network element on or off. Button VNC 712 is one entry points for the trainee into the virtual network that puts a window on trainee device 108 that is "inside" the target network. The window provides desktop access to the virtual machine corresponding to the button VNC 712. From that window, the trainee can interact directly with that virtual machine or with any other virtual machine inside the target network using standard remote access software.

The user may also assign names and IP addresses to various network elements. In addition, for servers, workstations, or other computing devices, the user may specify the types of devices or operating systems that are used. Examples are shown in FIG. 7. In one embodiment, each modeled network element may be implemented by one or target machines 111A-111N in target system 112.

Screen area 708 of FIG. 7 is a control area. Screen area 708 provides status information, such as whether the network is ready or not ready. Screen area 708 may also provide additional control status information that is displayed during the course of the exercise.

Screen area 710 is a network control area. The user may, for example, start or stop the network by selecting the corresponding, displayed buttons. The user may start the network to proceed with the execution of a scenario of a training exercise, and may stop the network to stop or pause execution. Various other control functions may be provided within screen area 710.

FIG. 7 also shows various selectable tabs 700, 702, and 704 that are displayed on the screen. User selection of one of these tabs 700, 702, and 704 changes the information is displayed within the window. It is assumed in FIG. 7 that the user has previously selected tab 700 to display the shown information in screen areas 706, 708, and 710. The user may also select tab 702 to change the display to the electronic notebook, an example of which is shown in FIG. 8, or select tab 704 to view the audit log, an example of which is shown in FIG. 9.

Figure 8:
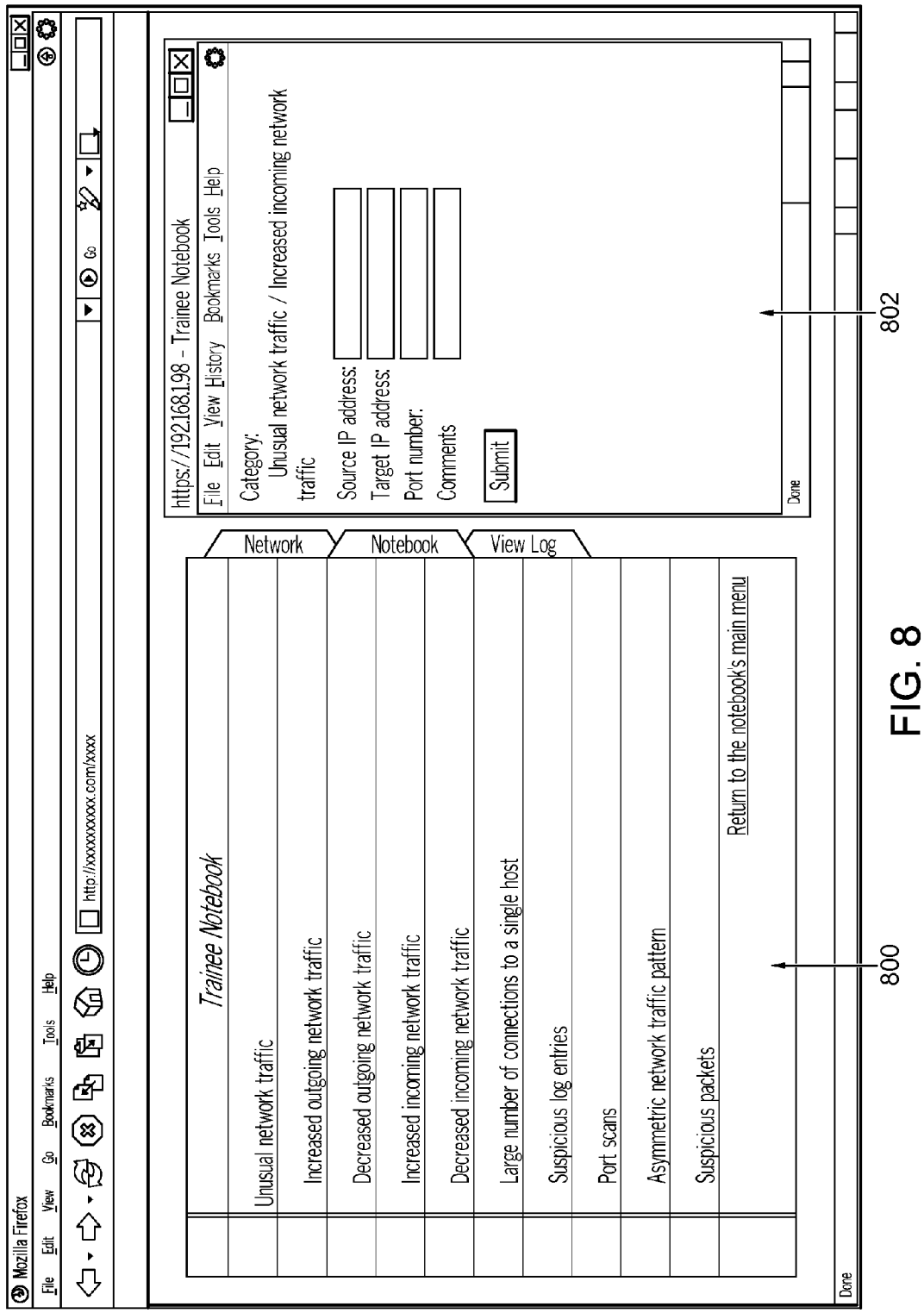
FIG. 8 is a screen diagram illustrating an electronic notebook that may be used by a user within the training environments shown in FIGS. 1A and 1B, according to one embodiment.

FIG. 8 is a screen diagram illustrating an electronic notebook that may be used by a user within training environments 100 and 150 shown in FIGS. 1A and 1B, according to one embodiment. For example purposes only in the description below, it will be assumed that training environment 100 is used. The electronic notebook may be displayed to a user, such as a trainee, after the user has selected tab 702 (FIG. 7). Within screen area 800, various notebook categories are displayed to the user. Example categories are shown in FIG. 8, which relate to unusual network traffic that may be observed. In general, a trainee may record observations and conclusions within the electronic notebook at any time during or after an exercise. In one embodiment, participant evaluator 210 (FIG. 2A) provides various pre-defined categories for selection within screen area 800. (Participant evaluator 210, in this embodiment, may be implemented on one or more of control/monitoring system 106 and target system 112.) The trainee may then select one or more of these categories. The trainee may also provide or add additional categories, as well, in some cases.

As is shown in FIG. 8, various example categories are shown in screen area 800 related to unusual network traffic observed within target system 112. This is just one of many high-level categories that are listed on an earlier screen of the trainee notebook. Within this high-level category, there are various low-level example categories displayed to the user, as well. Thus, the user may select one or more of these low-level categories, such as increased outgoing network traffic, decreased outgoing network traffic, increased incoming network traffic, decreased incoming network traffic, a large number of connection made with a single host, suspicious log entries, port scans, an asymmetric network traffic pattern, or suspicious packets in general.

When the trainee selects one of these example categories, a window 802 is then displayed for the electronic notebook. In the example of FIG. 8, it is assumed that the trainee has selected the high-level category of unusual network traffic and the low-level category of increased incoming network traffic. Within window 802, the trainee may insert or otherwise record additional information. Thus, if the trainee has observed increased incoming network traffic into target system 112 during an exercise, the trainee may record the source IP address of such traffic, the target IP address, one or more port numbers for the source and/or destination, or additional free-form comments.

For example, if the trainee has observed that attack machine 109A (FIG. 1A) has increased an amount of network traffic arriving at target machine 111A, the trainee may record the source IP address and port of attack machine 109A, and also the target IP address and port of target machine 111A, within window 802. Within the comments field of window 802, the trainee may record any additional observations or conclusions as to why there may be increased incoming traffic. When finished recording information, the trainee may select the submit button within window 802 to record and store the notebook entry. In one embodiment, participant evaluator 210, which may be implemented on one or more of control/monitoring system 106 and target system 112, may store the notebook entry within evaluation database 408 (FIG. 4). This entry, along with other entries that may be stored during a training exercise, may be used by participant evaluator 210 to generate an automated evaluation of the trainee's performance.

FIG. 9 is a screen diagram illustrating an audit log that may be used within training environments 100 and 150 shown in FIGS. 1A and 1B, according to one embodiment. For example purposes only in the description below, it will be assumed that training environment 100 is used.

In the embodiment shown in FIG. 9, the audit log may be stored within evaluation database 408 (FIG. 4). The information contained within the audit log may be displayed to a user in a format such as the one shown in FIG. 9. The information may, for example, be displayed on trainee device 108 to the trainee, or be displayed on instructor device 104 to the instructor. In one embodiment, an instructor is also capable of adding information directly to the audit log shown in FIG. 9, and then storing this information within a data store, such as evaluation database 408.

As shown in the example of FIG. 9, the audit log includes individual entries in rows. Each row may include evaluation information, system information, instant message information, electronic notebook information, or other information. Evaluation information includes information related to specific actions taken by the trainee, or information associated to these actions. System information includes information logged by control/monitoring system 106, attack system 110, and/or target system 112 during execution of the training exercise. In certain cases, the system information may relate to responses that are taken by attack system 110 in response to the trainee's actions. Instant message information includes information related to instant messages sent or received by trainee device 108. The trainee may exchange instant messages with the instructor, with control/monitoring system 106, or with other trainees. Electronic notebook information relates to notebook entries recorded by the trainee. These entries may also be stored in evaluation database 408.

The example audit log includes information columns 900, 902, 904, 906, 908, and 910. Information contained in column 900 indicates whether an individual row entry corresponds to evaluation information, system information, instant message information, electronic notebook information, or other information. Information in column 902 specifies a date and time stamp for the particular row entry. Information in column 904 provides a brief description of the audit log entry. Information in column 906 provides data relating to specific and relevant parameters for the entry (e.g., system name/ID, IP address, port number), while information in column 908 provides data related to values for these parameters. These values may have been automatically collected by training environment 100, or may have been manually entered by a user (such as by a trainee within the electronic notebook).

Information in column 910 includes a grade or point value, according to one embodiment. Participant evaluator 210 (FIG. 2A) is capable of automatically providing a grade or point value within column 910. In addition, the instructor is also capable of manually entering the grade or point value within column 910. Typically, column 910 includes entries for rows pertaining to evaluation information or notebook entries. In this example, the grade or point value is based upon the type of remedial action or diagnostic observation taken by the trainee to defend or mitigate an attack initiated by attack system 110. The trainee may view the information contained in column 910 to better understand a point distribution for the trainee's evaluation.

As can be seen from the example audit log of FIG. 9, the trainee, after initiation of the training exercise, has added a firewall rule to address an attack from attack system 110. Attack system 110 then stops a single-source DoS attack and begins a multiple-source DoS attack to a single target device (IP address) on target system 112. The target device may correspond to one of target machines 111A-111N. Column 908 shows example source IP addresses that have been implemented by attack system 110 for the multi-source attack. This attack affects service availability of the target device. The trainee then records a notebook entry indicating an observation that there is an increased amount of incoming network traffic to the target device. As a result, the trainee enables SYN cookies for the target device by changing the syncookies flag. As shown in FIG. 9, participant evaluator 210 awards points to the trainee for each of his correct actions and observations according to the training scenario.

In one or more example embodiments, the techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied in one or more computer-readable media, such as a computer-readable storage medium, containing instructions. Instructions embedded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments have been described herein. These and other embodiments are within the scope of the following claims.

The invention claimed is:

1. A method comprising:
during a computer-based training exercise, initiating, by an attack system, a simulated attack against a target system, wherein the target system is configured to respond to actions specified by a human trainee, wherein the target system performs a corrective or preventive action that is specified by the human trainee in response to the simulated attack, and wherein the attack system is configured to initiate a change in the simulated attack by dynamically responding to the corrective or preventive action performed by the target system and specified by the human trainee;
collecting information associated with the corrective or preventive action performed by the target system in response to the simulated attack; and
based on the corrective or preventive action performed by the target system:
updating a state of the attack system;
automatically generating, by the attack system and based on the updated state of the attack system, dynamic response data;
sending the dynamic response data from the attack system to the target system, wherein sending the dynamic response data initiates the change in the simulated attack against the target system; and
upon completion of the training exercise, generating an automated evaluation of a performance of the human trainee.

2. The method of claim 1, wherein the attack system and the target system comprise one or more virtual machines.

3. The method of claim 1, further comprising:
processing scenario traffic for the training exercise on a first communication channel;
processing out-of-band data for the training exercise on a second communication channel that is distinct from the first communication channel, such that the out-of-band data does not interfere with the scenario traffic; and
controlling the training exercise using the out-of-band data.

4. The method of claim 1, wherein collecting the information associated with the corrective or preventive action performed by the target system comprises receiving user input from the user indicating a reason for performing the corrective or preventive action.

5. The method of claim 4, wherein generating the automated evaluation comprises analyzing the user input to determine if the indicated reason for performing the corrective or preventive action is correct according to the training exercise.

6. The method of claim 4, wherein receiving the user input comprises receiving the user input either by way of an electronic notebook that records information entered by the human trainee or by way of an instant message exchange with the human trainee.

7. The method of claim 1,
wherein collecting the information associated with the corrective or preventive action performed by the target system comprises collecting active feedback data and passive feedback data,
wherein the active feedback data comprises one or more of action data, state data, or metric data, and
wherein the passive feedback data comprises one or more of notebook data, instant message data, or state knowledge data.

8. A non-transitory computer-readable storage medium comprising instructions that, when executed, cause one or more processors to:
during a training exercise, initiate, by an attack system, a simulated attack against a target system, wherein the target system is configured to respond to actions specified by a human trainee, wherein the target system performs a corrective or preventive action that is specified by the human trainee in response to the simulated attack, and wherein the attack system is configured to initiate a change in the simulated attack by dynamically responding to the corrective or preventive action performed by the target system and specified by the human trainee;
collect information associated with the corrective or preventive action performed by the target system in response to the simulated attack; and based on the corrective or preventive action performed by the target system:
  update a state of the attack system;
  automatically generate, by the attack system and based on the updated state of the attack system, dynamic response data;
  send the dynamic response data from the attack system to the target system, wherein sending the dynamic response data initiates the change in the simulated attack against the target system; and
  upon completion of the training exercise, generate an automated evaluation of a performance of the human trainee.

9. The non-transitory computer-readable storage medium of claim 8, wherein the attack system and the target system comprise one or more virtual machines.

10. The non-transitory computer-readable storage medium of claim 8, further comprising instructions that, when executed, cause the one or more processors to:
  process scenario traffic for the training exercise on a first communication channel;
  process out-of-band data for the training exercise on a second communication channel that is distinct from the first communication channel, such that the out-of-band data does not interfere with the scenario traffic; and
  control the training exercise using the out-of-band data.

11. The non-transitory computer-readable storage medium of claim 8, wherein the instructions that cause the one or more processors to collect the information associated with the corrective or preventive action performed by the target system comprise instructions that cause the one or more processors to receive user input from the user indicating a reason for performing the corrective or preventive action.

12. The non-transitory computer-readable storage medium of claim 11, wherein the instructions that cause the one or more processors to generate the automated evaluation comprise instructions that cause the one or more processors to analyze the user input to determine if the indicated reason for performing the corrective or preventive action is correct according to the training exercise.

13. The non-transitory computer-readable storage medium of claim 11, wherein the instructions that cause the one or more processors to receive the user input comprise instructions that cause the one or more processors to receive user input either by way of an electronic notebook that records information entered by the human trainee or by way of an instant message exchange with the human trainee.

14. The non-transitory computer-readable storage medium of claim 8,
  wherein the instructions that cause the one or more processors to collect the information associated with the corrective or preventive action performed by the target system comprise instructions that cause the one or more processors to collect active feedback data and passive feedback data,
  wherein the active feedback data comprises one or more of action data, state data, or metric data, and
  wherein the passive feedback data comprises one or more of notebook data, instant message data, or state knowledge data.

15. A system comprising:
  one or more processors,
  wherein the one or more processors are configured to:
    during a training exercise, initiate, by an attack system, a simulated attack against a target system, wherein the target system is configured to respond to actions specified by a human trainee, wherein the target system performs a corrective or preventive action that is specified by the human trainee in response to the simulated attack, and wherein the attack system is configured to initiate a change in the simulated attack by dynamically responding to the corrective or preventive action performed by the target system and specified by the human trainee;
    collect information associated with the corrective or preventive action performed by the target system in response to the simulated attack; and
    based on the corrective or preventive action performed by the target system:
      update a state of the attack system;
      automatically generate, by the attack system and based on the updated state of the attack system, dynamic response data;
      send the dynamic response data from the attack system to the target system, wherein sending the dynamic response data initiates the change in the simulated attack against the target system; and
      upon completion of the training exercise, generate an automated evaluation of a performance of the human trainee.

16. The system of claim 15, wherein the attack system and the target system comprise one or more virtual machines.

17. The system of claim 15, wherein the one or more processors are further configured to:
  process scenario traffic for the training exercise on a first communication channel;
  process out-of-band data for the training exercise on a second communication channel that is distinct from the first communication channel, such that the out-of-band data does not interfere with the scenario traffic; and
  control the training exercise using the out-of-band data.

18. The system of claim 15, wherein the one or more processors configured to collect the information associated with the corrective or preventive action performed by the target system are configured to receive user input from the user indicating a reason for performing the corrective or preventive action.

19. The system of claim 18, wherein the one or more processors configured to generate the automated evaluation are configured to analyze the user input to determine if the indicated reason for performing the corrective or preventive action is correct according to the training exercise.

20. The system of claim 18, wherein the one or more processors configured to receive the user input are configured to receive the user input either by way of an electronic notebook that records information entered by the human trainee or by way of an instant message exchange with the human trainee.

21. The system of claim 15,
  wherein the one or more processors configured to collect the information associated with the corrective or preventive action performed by the target system are configured to collect active feedback data and passive feedback data,
  wherein the active feedback data comprises one or more of action data, state data, or metric data, and
  wherein the passive feedback data comprises one or more of notebook data, instant message data, or state knowledge data.

22. The system of claim 15, wherein the attack system and the target system are included within one attack/target system, and wherein the attack against the target system comprises an insider attack.

* * * * *